US011977349B2

(12) United States Patent
Yokote et al.

(10) Patent No.: US 11,977,349 B2
(45) Date of Patent: May 7, 2024

(54) IMAGE FORMING APPARATUS

(71) Applicant: CANON KABUSHIKI KAISHA, Tokyo (JP)

(72) Inventors: Akihito Yokote, Chiba (JP); Taichi Takemura, Chiba (JP); Saeko Oishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/863,132

(22) Filed: Jul. 12, 2022

(65) Prior Publication Data

US 2023/0013372 A1 Jan. 19, 2023

(30) Foreign Application Priority Data

Jul. 13, 2021 (JP) ................................. 2021-115829

(51) Int. Cl.
*G03G 15/00* (2006.01)

(52) U.S. Cl.
CPC ..... *G03G 15/5041* (2013.01); *G03G 15/5045* (2013.01); *G03G 15/5058* (2013.01); *G03G 15/5062* (2013.01); *G03G 2215/00042* (2013.01)

(58) Field of Classification Search
CPC ........... G03G 15/5041; G03G 15/5054; G03G 15/5058; G03G 15/5062; G03G 15/5045; G03G 2215/00029–00046; G03G 2215/00059; G03G 2215/00063; G03G 2215/00067; H04N 1/00045; H04N 1/00068
See application file for complete search history.

(56) References Cited

U.S. PATENT DOCUMENTS

| | | | | |
|---|---|---|---|---|
| 5,220,373 | A | 6/1993 | Kanaya | |
| 5,950,043 | A * | 9/1999 | Fujita | G03G 15/0856 399/60 |
| 6,418,281 | B1 | 7/2002 | Ohki | |
| 7,072,597 | B2 | 7/2006 | Shimura et al. | |
| 8,194,299 | B2 | 6/2012 | Yamashita et al. | |
| 8,547,596 | B2 | 10/2013 | Tonami et al. | |
| 9,310,742 | B2 | 4/2016 | Shirafuji | |
| 9,897,956 | B2 | 2/2018 | Takemura | |

(Continued)

FOREIGN PATENT DOCUMENTS

| | | | |
|---|---|---|---|
| JP | 05-72859 | A | 3/1993 |
| JP | 2000-238341 | A | 9/2000 |

(Continued)

*Primary Examiner* — Carla J Therrien
(74) *Attorney, Agent, or Firm* — Venable LLP

(57) ABSTRACT

An image forming apparatus includes an image forming unit to form an image based on an image forming condition; a sensor to measure a measurement image formed by the image forming unit; and a controller to obtain information correlated with a change in density of an image to be formed by the image forming unit, control the sensor to measure the measurement image, determine first data related to density of the image to be formed by the image forming unit, determine, based on a result of measuring the measurement image, second data related to density of the image to be formed by the image forming unit, and generate the image forming condition based on a weighted average of the first data and the second data.

9 Claims, 14 Drawing Sheets

(56) References Cited

U.S. PATENT DOCUMENTS

| | | | | |
|---|---|---|---|---|
| 11,232,332 | B2 | 1/2022 | Yokote | |
| 11,378,908 | B2 | 7/2022 | Haga | |
| 11,442,388 | B2 | 9/2022 | Yokote | |
| 11,516,369 | B2 | 11/2022 | Shiga | |
| 2011/0235129 | A1* | 9/2011 | Ohkawa ............. | H04N 1/00063 358/406 |
| 2016/0085194 | A1 | 3/2016 | Shirafuji | |
| 2017/0038719 | A1 | 2/2017 | Takemura et al. | |
| 2017/0041509 | A1 | 2/2017 | Itagaki | |
| 2019/0086851 | A1 | 3/2019 | Takemura | |
| 2021/0041822 | A1 | 2/2021 | Yokote | |
| 2023/0090095 | A1* | 3/2023 | Takemura .......... | H04N 1/00015 358/1.9 |
| 2023/0098328 | A1 | 3/2023 | Yokote et al. | |
| 2023/0098673 | A1 | 3/2023 | Shiga | |

FOREIGN PATENT DOCUMENTS

| | | | |
|---|---|---|---|
| JP | 2003-167394 | A | 6/2003 |
| JP | 2017-037100 | A | 2/2017 |
| JP | 2023-038807 | A | 3/2023 |
| JP | 2023-48849 | A | 4/2023 |

* cited by examiner

IMAGE FORMING APPARATUS

BACKGROUND OF THE INVENTION

Field of the Invention

The present invention relates to an image forming apparatus and, for example, to an image forming apparatus that uses an electrophotographic process.

Description of the Related Art

In an image forming apparatus, the density and tone characteristics of an output image may differ from desired density and tone characteristics due to short-term variation caused by variation in the environment in which the apparatus is installed and variation in the environment within the apparatus, long-term variation caused by temporal change (temporal deterioration) in a photosensitive member or a developer, or the like. Therefore, in the image forming apparatus, in order to adjust the density and tone characteristics of the output image to a desired density and tone characteristics, it is necessary to correct the image forming conditions as needed in consideration of these various variations.

The process of appropriately correcting the change in density or tone in this manner is generally referred to as calibration. In the calibration, for example, some pattern images having a uniform density are formed on a sheet, a photosensitive member, an intermediate transfer member, or the like, the density of the formed pattern is measured and compared with a target value, and various conditions for forming an image are appropriately adjusted based on the comparison result.

Conventionally, in order to stabilize the density and tone characteristics of an output image, a specific correction pattern such as a tone pattern is formed on a sheet as disclosed in Japanese Patent Laid-Open No. 2000-238341, for example. The stability of the image quality is improved by reading a formed pattern with an image reading unit and feeding back the read tone pattern information into an image forming condition such as $\gamma$ (gamma) correction.

In addition, regarding when calibration is required, it is necessary to correct the tone characteristics as appropriate in various situations, including cases where the environment changes as described above or the apparatus is left unattended for a long time. For example, it is necessary to correct the tone characteristics when environmental variation is particularly liable to occur such as when the power is turned on or when the apparatus returns from a power saving mode first thing in the morning, and in a case where the toner replenishment amount is large due to an output image duty being high, or conversely, when jobs having a low output image duty have been performed continuously. As a technique for performing such calibration, for example, a method such as Japanese Patent Laid-Open No. 2003-167394 has been proposed. Japanese Patent Laid-Open No. 2003-167394 uses a method in which a density patch image of each color is formed on an intermediate transfer member or a transfer belt, the density patch images are read by a density detection sensor, and the detected results are fed back into a charging condition for the intermediate transfer member or an image processing condition to thereby adjust the halftone tone characteristics and the maximum density of each color.

In recent years, there has been an increasing demand for improving, together with stability of image quality, usability, and especially productivity by reducing of standby time and downtime, and there is a strong demand for being able to perform calibration control for image quality stabilization over a shorter time. As a technique to handle such demand, models have been created in which variations in external environment, image output conditions, and various sensor values are used as input values, and variations in patches for calibration are predicted from the model, as in Japanese Patent Laid-Open No. 2017-37100, for example. In this way, there have been proposed techniques for reducing the process of forming an image of the patches, which consumes much of the time in calibration.

However, the following problems arise in the method of measuring variations in tone and density by a density detection sensor as described above.

As a method of forming a density patch image on an intermediate transfer belt and reading the image by an optical sensor which is a density detection sensor, there are a diffuse reflection light detection method and a specular reflection light detection method. In the diffuse reflection light detection method, the change in the amount of diffuse reflected light from the density patch is detected for the light irradiated from the optical sensor. In the specular reflection light detection method, a change in the amount of specular reflected light from an intermediate transfer belt is detected. The diffuse reflection light detection method is widely used for density patches of toner of colors such as cyan, magenta, and yellow which exhibit a characteristic of diffusely reflecting incident light, and on the contrary, the specular reflection light detection method is widely used for black which absorbs light rather than diffusely reflecting the light.

One of the problems of the prior art is that the method of detecting a density patch by the diffuse reflection light detection method described above is affected by the shape of the surface of the transfer belt. When initially the surface of the intermediate transfer belt is uniform and there are few uneven portions in the transfer belt, very little light incident on a gap between the toner of the density patches is diffusely reflected from the surface of the intermediate transfer belt. However, when the belt has been used to an intermediate-stage or a late-stage, the surface of the intermediate transfer belt will have become rougher due to the friction with an abutting member or transfer sheets, such that extremely small unevenness is produced, and characteristics of diffuse reflection with respect to the incident light begin to be exhibited. Since the extremely small unevenness exists as irregular unevenness on the intermediate transfer belt, the measurement accuracy of the density patch drops, and as a result, the accuracy of various corrections deteriorates, and there is a possibility that variation in the density of the printed matter will occur.

Meanwhile, in a calibration method in which the variation of the tone or the density is not measured but predicted by a model, the following problem occurs.

In a density prediction model, a model is created by performing machine learning from the results of data acquisition under conditions such as a usage environment, a usage state of a part, and an image to be printed. Here, the conditions are for an envisioned average range. Although prediction accuracy is high within the envisioned range for the condition, prediction accuracy may drop when the usage deviates from the envisioned condition. This is because it is common to use an average model that can cover certain usage environments and situations, but it is not necessarily optimal for individual usage environments. Factors that decrease the prediction accuracy include factors that are internal to the apparatus and factors that are external disturbances. Examples of the factors that are internal disturbances include cases in which conditions are such that individual differences are liable to occur such as when a part of the image forming apparatus is in an initial state or a late-stage state. Examples of factors that are external disturbances include an abrupt change in the temperature and humidity environment, an abrupt change in image density of a printed image, and the like.

SUMMARY OF THE INVENTION

The present invention has been made in view of the above circumstances, and provides an image forming apparatus capable of performing highly accurate density correction control.

The present invention has the following configurations. That is, according to one aspect of the present invention, there is provided an image forming apparatus, comprising: an image forming unit configured to form an image based on an image forming condition; a sensor configured to measure a measurement image formed by the image forming unit; and a controller configured to: obtain information correlated with a change in density of an image to be formed by the image forming unit, control the sensor to measure the measurement image formed by the image forming unit, determine, based on the information, first data related to density of the image to be formed by the image forming unit, determine, based on a result of measuring the measurement image by the sensor, second data related to density of the image to be formed by the image forming unit, and generate the image forming condition based on a weighted average of the first data and the second data.

According to the present invention, density correction control can be performed with good accuracy.

Further features of the present invention will become apparent from the following description of exemplary embodiments with reference to the attached drawings.

DESCRIPTION OF THE EMBODIMENTS

Embodiment 1

Figure 1:
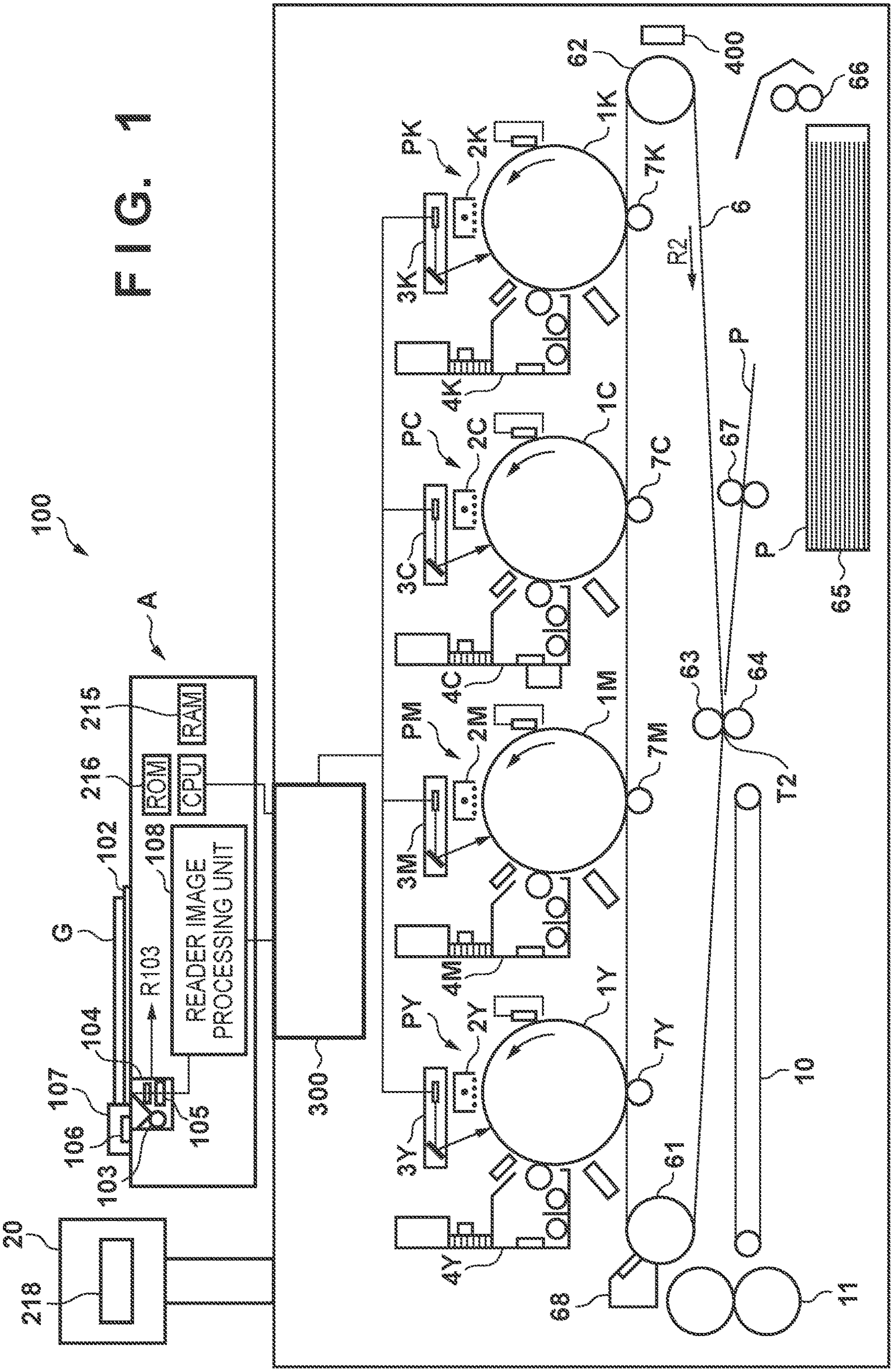
FIG. 1 is an overall schematic configuration diagram of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First, a first embodiment of the present invention will be described. In the present embodiment, a method for solving the above-mentioned problem will be described using an electrophotographic (or electrophotographic process) image forming apparatus. An electrophotographic method will be described, but the same problem exists for inkjet printers, dye sublimation printers, or the like; the characteristics of control, particularly the matter described in the claims can be applied to such printers and the problem that the invention addresses can be solved by using the method described hereinafter. Therefore, the invention according to the above-mentioned claims encompasses various kinds of image forming apparatuses.

Image Forming Apparatus

Reader Unit

As shown in FIG. 1, an image forming apparatus 100 includes a reader unit A. An original placed on an original platen glass 102 of the reader unit A is illuminated by a light source 103, and light reflected from the original passes through an optical system 104 and is imaged in a CCD sensor 105. The CCD sensor 105 consists of CCD line sensors arranged in three rows for red, green, and blue, and generates red, green, and blue color component signals for the respective line sensors. These reading optical system units are moved in the direction of an arrow R103 shown in FIG. 1, and converts an image of the original into an electric signal for each line. A positioning member 107 for abutting one side of the original to prevent the original from being arranged diagonally and a reference white plate 106 for determining a white level of the CCD sensor 105 to perform shading correction for an image captured by the CCD sensor 105 are arranged on the original platen glass 102. An image signal obtained by the CCD sensor 105 is subjected to A/D conversion by a reader image processing unit 108, shading correction using a read signal of the reference white plate 106, and color conversion, and then is sent to a printer unit, and is processed by a printer control unit. The reader unit A is connected to an operation unit 20 for an operator to perform operations such as an operation to start a copy or to perform various settings and is connected to a display device 218. The reader unit A may be provided with a CPU for performing other control, a RAM 215, and a ROM 216. These elements control the reader unit A.

Printer Unit

As shown in FIG. 1, the image forming apparatus 100 is a tandem intermediate transfer full color printer in which yellow, magenta, cyan, and black image forming units PY, PM, PC, and PK are arranged along an intermediate transfer belt 6.

In the image forming unit PY, a yellow toner image is formed on a photosensitive drum 1Y and is primary-transferred to the intermediate transfer belt 6. In the image forming unit PM, a magenta toner image is formed on a photosensitive drum 1M and is primary-transferred to the intermediate transfer belt 6 so as to overlap the yellow toner image. In the image forming units PC and PK, a cyan toner image and a black toner image are formed on the photosensitive drums 1C and 1K, respectively, and the cyan toner image and black toner image are similarly overlappingly primary-transferred to the intermediate transfer belt 6 in sequence.

The four colors of toner images that have been primary-transferred onto the intermediate transfer belt 6 are conveyed to a secondary transfer unit T2 and are collectively secondary-transferred to a recording material P. The recording material P, after the four-color toner image is secondary-transferred thereto, is conveyed by a conveying belt 10, heated and pressurized by a fixing device 11 to thereby fix the toner image to its surface, and then is discharged to the outside of the device.

The intermediate transfer belt 6 is supported by a tension roller 61, a driving roller 62, and an opposing roller 63, and is driven by the driving roller 62 rotating in the direction of an arrow R2 at a predetermined process speed.

Recording materials P drawn out from a recording material cassette 65 are separated one by one by a separating roller 66 and fed to a resist roller 67. The resist roller 67 receives the recording material P in a stopped state and stands by, and then feeds the recording material P to the secondary transfer unit T2 at a timing aligned with the toner image on the intermediate transfer belt 6.

The secondary transfer roller 64 contacts the intermediate transfer belt 6 supported by the opposing roller 63 to form the secondary transfer unit T2. When a DC voltage having a positive polarity is applied to the secondary transfer roller 64, a toner image charged to a negative polarity and carried on the intermediate transfer belt 6 is secondary-transferred to the recording material P.

The image forming units PY, PM, PC, and PK are configured to be substantially the same except that the colors of the toners used in developing apparatuses 4Y, 4M, 4C and 4K are yellow, magenta, cyan, and black. In the following description, subscripts Y, M, C, and K, attached to the reference numerals to indicate that the respective color, are omitted when no particular distinction is required and something is explained collectively.

As shown in FIG. 1, a charging device 2, an exposure device 3, the developing apparatus 4, the primary transfer roller 7, and a cleaning device are arranged around the photosensitive drum 1 in the image forming unit.

In the photosensitive drum 1, a photosensitive layer that has a negative charge polarity is formed on the outer surface of an aluminum cylinder, and the photosensitive drum 1 rotates in the direction of the arrow at a predetermined processing speed. The photosensitive drum 1 is an OPC photoconductive element having a reflectance of about 40% for near-infrared light (960 nm). However, the photosensitive drum 1 may be an amorphous silicon-based photosensitive member or the like having about the same reflectivity.

The charging device 2 uses a scorotron charger, and irradiates the photosensitive drum 1 with charged particles accompanying a corona discharge to charge the surface of the photosensitive drum 1 to a uniform negative potential. The scorotron charger has a wire to which a high voltage is applied, a shield unit connected to ground, and a grid unit to which a desired voltage is applied. A predetermined charging bias is applied to the wire of the charging device 2 from a charge bias power source (not shown). A predetermined grid bias is applied to the grid unit of the charging device 2 from a grid bias power source (not shown). Although it also depends on the voltage applied to the wire, the photosensitive drum 1 is charged substantially to the voltage applied to the grid unit.

The exposure apparatus 3 scans a laser beam from the light source with a rotary mirror and writes an electrostatic image of an image on the surface of the charged photosensitive drum 1. A potential sensor (not shown), which is an example of a potential detection means, can detect the potential of an electrostatic image formed by the exposure apparatus 3 on the photosensitive drum 1. The developing apparatus 4 has a developing roller that carries toner, and develops a toner image by causing the toner carried on the developing roller to attach to the electrostatic image of the photosensitive drum 1.

The primary transfer roller 7 presses the inner surface of the intermediate transfer belt 6 to form a primary transfer unit between the photosensitive drum 1 and the intermediate transfer belt 6. DC voltage of a positive polarity is applied to the primary transfer roller 7, whereby the negative polarity toner image carried on the photosensitive drum 1 is primary-transferred onto the intermediate transfer belt 6 passing through the primary transfer unit.

An image density sensor (patch detection sensor) 400 is disposed so as to face the intermediate transfer belt, and measures the image density of unfixed toner. In the present embodiment, the image density sensor is configured so as to be disposed to face the intermediate transfer belt, but it is also possible for it to be configured to be disposed as appropriate so as to face the photosensitive drum. The image density sensor disposed above the photosensitive drum, the intermediate transfer belt, or the like is a sensor for measuring the image density of unfixed toner. It is also possible to arrange an image density sensor for measuring a pattern image after fixing of the image by a downstream fixing device, and the invention is not limited to the image density sensor described in this embodiment.

The cleaning device causes a cleaning blade to rub against the photosensitive drum 1 to recover residual toner which failed to be transferred to the intermediate transfer belt 6 and remains on the photosensitive drum 1.

A belt cleaning apparatus 68 causes a cleaning blade to rub against the intermediate transfer belt 6, and collects residual toner that failed to be transferred to the recording material P, passed through the secondary transfer unit T2, and remained on the intermediate transfer belt 6.

Image Processing Unit

Figure 2:
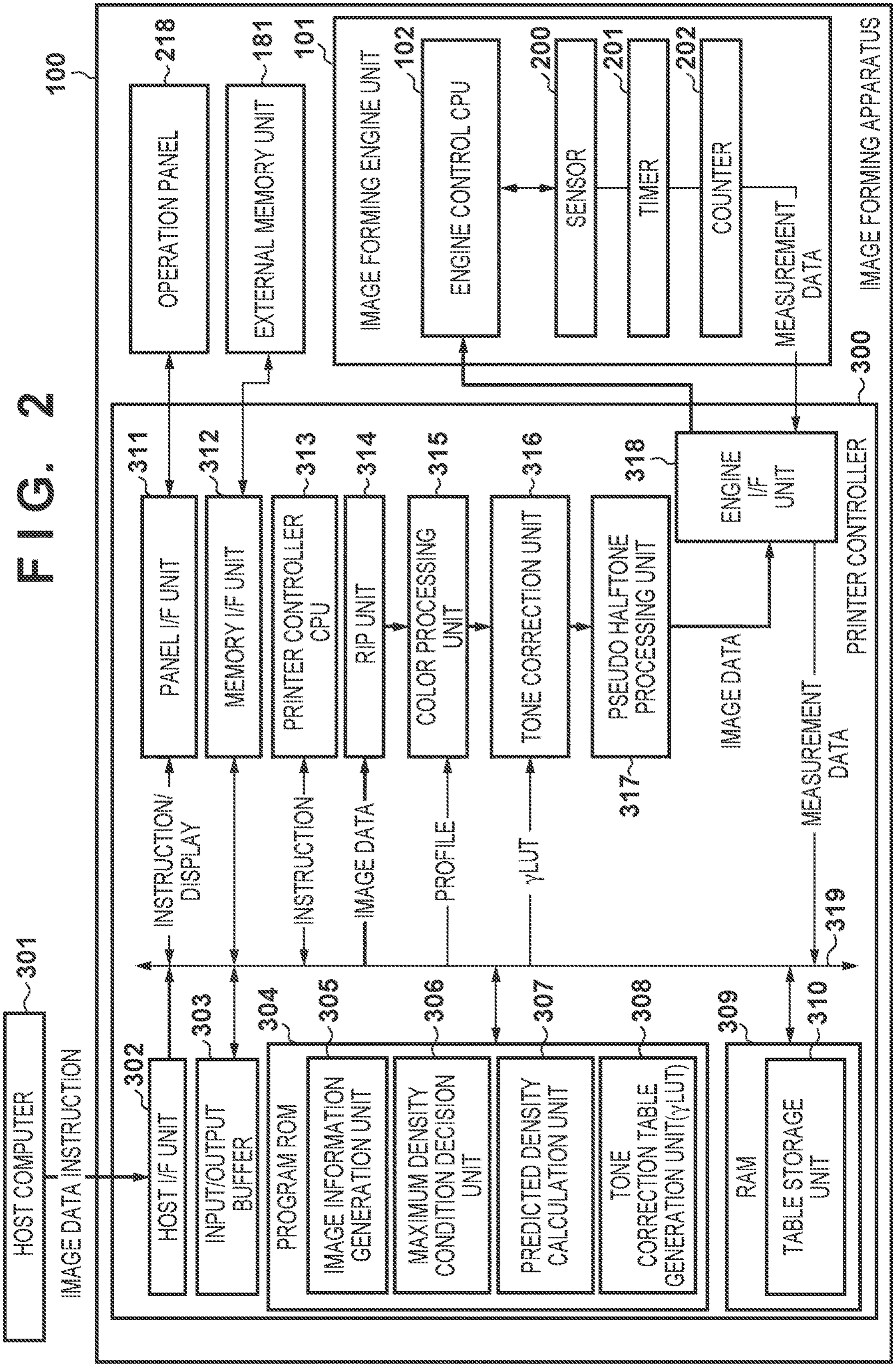
FIG. 2 is a printing system configuration diagram.

FIG. 2 is a diagram showing a configuration of a printing system according to the present invention. In the figure, reference numeral 301 denotes a host computer, and reference numeral 100 denotes an image forming apparatus. The host computer 301 and the image forming apparatus 100 are connected by a communication line such as USB 2.0 High-Speed, 1000Base-T/100Base-TX/10Base-T (conforms to IEEE 802.3).

In the image forming apparatus 100, a printer controller 300 controls overall operation of the printer. The printer controller 300 has the following configuration.

A host I/F unit 302 manages input and output to and from the host computer 301.

An input/output buffer 303 transmits and receives control codes from the host I/F unit 302 and data from various communication means.

A printer controller CPU 313 controls overall operation of the controller 300.

A program ROM 304 contains control programs and control data for the printer controller CPU 313.

A RAM 309 is used as a work memory for calculation necessary to interpret the above-described control codes and data and for printing, and for processing print data.

An image information generation unit 305 generates various image objects from settings in data received from the host computer 301.

An RIP (Raster Image Processor) unit 314 expands an image object into a bitmap image.

A color processing unit 315 performs multi-order color conversion processing.

A tone correction unit 316 executes single color tone correction.

A pseudo halftone processing unit 317 performs dither matrix or error diffusion pseudo halftone processing or the like.

An engine I/F unit 318 transfers the converted image to an image forming engine unit.

An image forming engine unit 101 forms the converted image data as an image.

The flow of the image processing of the printer controller at the time of basic image formation is indicated by thick solid lines.

The printer controller 300 performs not only image formation but also various control calculations. A control program for this purpose is contained in the program ROM 304. The control program and data includes the following.

A maximum density condition decision unit 306 performs a maximum density adjustment.

A predicted density calculation unit 307 predicts the density based on an output value from a sensor or the like.

A tone correction table generation unit (γLUT) 308 performs density tone correction. The generated tone correction table includes, for example, an output density value corresponding to an input density value as a correction value.

A prediction model correction unit 350 corrects a model for calculating a predicted density. A detailed description of various control operations in the printer controller will be described later. The tone correction table may be referred to as an image correction condition.

In addition, there is a table storage unit 310 for primary storage of adjustment results from the above-described maximum density condition decision unit 306, predicted density calculation unit 307, and tone correction table generation unit 308. Further, there is the operation panel 218 which is for operating the printing apparatus and making instructions to execute the above-described correction process, and a panel I/F unit 311 which connects the printer controller 300 and the operation panel 218. Further, there is an external memory unit 181 used for storing print data and various information of the printing apparatus, and the like, a memory I/F unit 312 which connects the controller 300 and the external memory unit 181, and a system bus 319 which connects the respective units.

Density Correction and Potential Control

Figure 4:
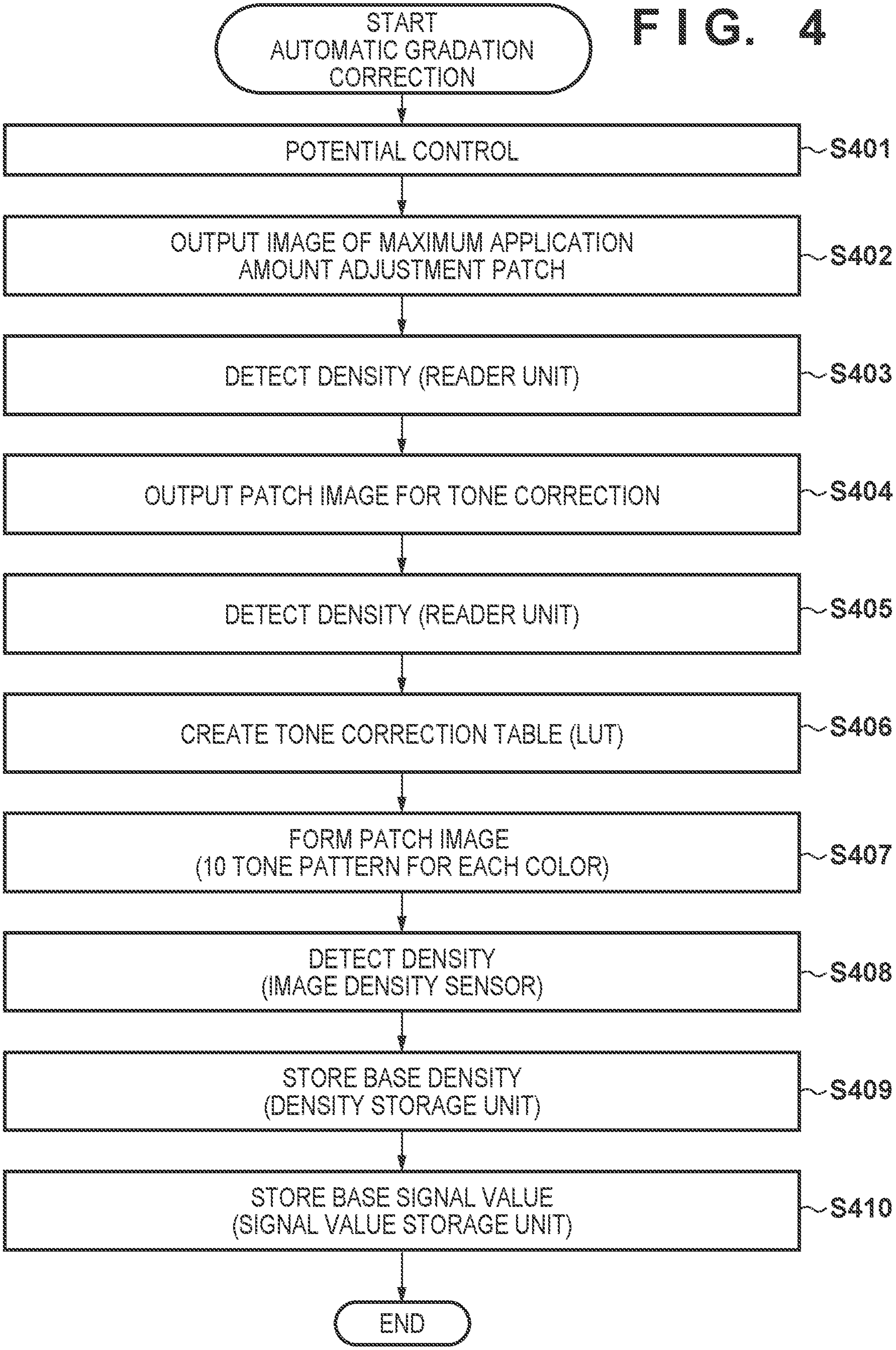
FIG. 4 is a view illustrating a flow when an automatic tone correction is executed in the present embodiment.

As shown in FIG. 4, the density correction used in the present embodiment is performed by a user arbitrarily and uses an output image formed on a sheet (a fixed toner image). In the present embodiment, a system having a potential sensor for measuring the potential on the drum surface is described, but the present invention is not limited thereto. Although the procedure of FIG. 4 is performed arbitrarily by the user, it may be performed at least once before the service of the apparatus is started, and thereafter, it may be performed arbitrarily.

When an automatic tone correction control is performed arbitrarily by the user, firstly, potential control processing (step S401) starts. The printer controller 300 determines a target charging potential (VdT), a grid bias (Y), and a developing bias (Vdc) by potential control before printing on the sheet. By the potential control processing, it is possible to determine a charging potential or the like in accordance with conditions of the environment in which the image forming apparatus 100 is installed (including conditions of temperature and humidity).

Figure 5:
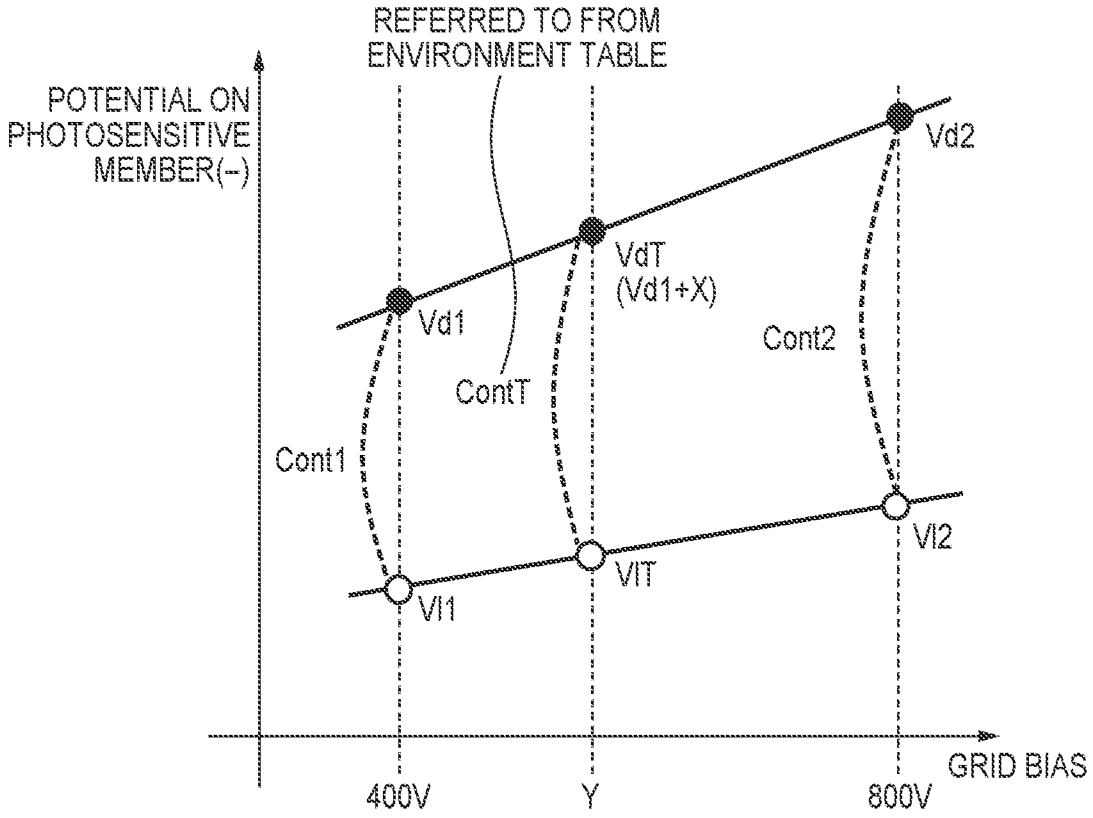
FIG. 5 is a conceptual explanatory diagram of two-point potential control in the present embodiment.

In the present embodiment, the printer controller 300 performs potential control called two-point potential control. FIG. 5 is a diagram illustrating the concept of two-point potential control. In FIG. 5, the horizontal axis represents the grid bias, and the vertical axis represents the photosensitive member surface potential. Vd1 represents the charging potential under a first charging condition (grid bias 400V), and Vl1 represents the potential of an exposure unit formed by a standard laser power. Vd2 represents the charging potential under a second charging condition (grid bias 800V), and Vl2 is the potential of the exposure unit formed by a standard laser power at that time. Contrast potentials (Cont1, Cont2) at the grid biases of 400V and 800V can be calculated with equations (1) and (2).

$$(\mathrm{Cont1})=(Vd1-Vl1) \tag{1}$$

$$(\mathrm{Cont2})=(Vd2-Vl2) \tag{2}$$

Here, the increase (ContΔ) in contrast potential for every 1V of charging potential can be calculated by equation (3) based on the results of equations (1) and (2).

$$(\mathrm{Cont}\Delta)=((\mathrm{Cont2}-\mathrm{Cont1})/(Vd2-Vd1)) \tag{3}$$

Meanwhile, an environment sensor (not shown) is provided in the image forming apparatus 100, and the environment sensor measures environmental conditions of the temperature and humidity in the image forming apparatus 100. The printer controller 300 obtains the environmental conditions (for example, an absolute moisture amount) in the image forming apparatus 100 based on the measurement result of the environmental sensor. Then, a target contrast potential (ContT) corresponding to the environmental condition is referred to from an environment table registered in advance.

The relationship between the target contrast potential (ContT) and the increase in contrast potential (ContΔ) can be calculated with equation (4).

$$\text{Cont}T=\text{Cont}1+X\cdot\text{Cont}\Delta \quad (4)$$

When a parameter "X" satisfying the relationship of equation (4) is calculated, the target charging potential (VdT) (hereinafter, also referred to as "target potential") can be calculated with equation (5).

$$VdT=Vd1+X \quad (5)$$

The charge potential change amount (VdΔ) per 1V of grid bias can be calculated with equation (6).

$$(Vd\Delta)=(Vd2-Vd1)/(800-400) \quad (6)$$

The grid bias (Y) for applying the target potential (VdT) can be calculated from equation (7).

$$\text{Target } VdT=400+Y\cdot Vd\Delta \quad (7)$$

In equation (7), VdΔ can be calculated with equation (6), and VdT can be calculated with equation (5). Therefore, the grid bias (Y) satisfying the relationship of equation (7) can be finally determined by substituting potentials known from equations (5) and (6).

Through the above processing, it is possible to determine the target potential (VdT) and the grid bias (Y) according to the environmental conditions. The development bias (Vdc) has a specified potential difference with respect to the target potential (VdT), and can be calculated by subtracting the specified potential from the determined target potential (VdT). At the determined development bias (Vdc), subsequent image formation is performed. The potential on each drum is negative, but the minus sign is omitted here in order to make the calculation process easier to understand. With the above processing, the potential control processing of step S401 of FIG. 4 is completed.

Maximum Toner Application Amount Adjustment

Next, the process proceeds to step S402, and a patch image for adjusting a maximum toner application amount is formed (step S402) using the grid bias (Y) determined by the potential control in the preceding step S401 and the developing bias (Vdc).

In a printer that prioritizes productivity, the flow described below is omitted, and the flow may adjust the maximum application amount only by the potential control. However, since the color material charge retention amount in the developing apparatus 4, the ratio at which the toner and the carrier are mixed, and the like also change depending on the environment and durability, potential control alone is of low accuracy. Therefore, in the present embodiment, a patch image for which exposure intensity (hereinafter referred to as LPW) is changed in several stages is formed, and an LPW to be used for normal image formation is determined.

Figure 6:
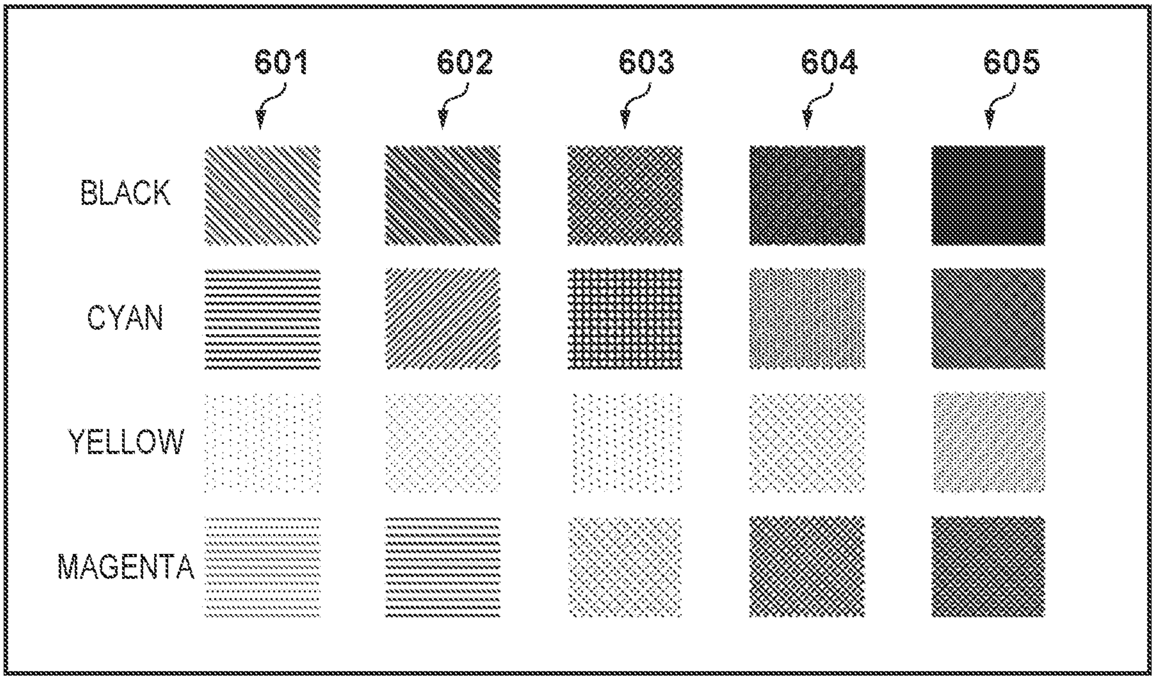
FIG. 6 is a view illustrating an example of a maximum toner application amount correction chart in the present embodiment.

The image forming apparatus 100 in which the grid bias (Y) and the development bias (Vdc) are determined forms five patch images 601 to 605 for each color (black, cyan, yellow, magenta) as shown in FIG. 6, in order to adjust the maximum application amount. The number of patches is not limited to this. The conditions for forming the five patch images are each different in LPW, and are LPW1, LPW2, LPW3 (corresponding to the standard laser power when used for potential control), LPW4, and LPW5 in order from the left. Laser power increases from LPW1 to LPW5 in order. Also, the number of colors of the patch may accord to the number of color components used in the image forming apparatus 100, and is not limited to four.

Figure 7:
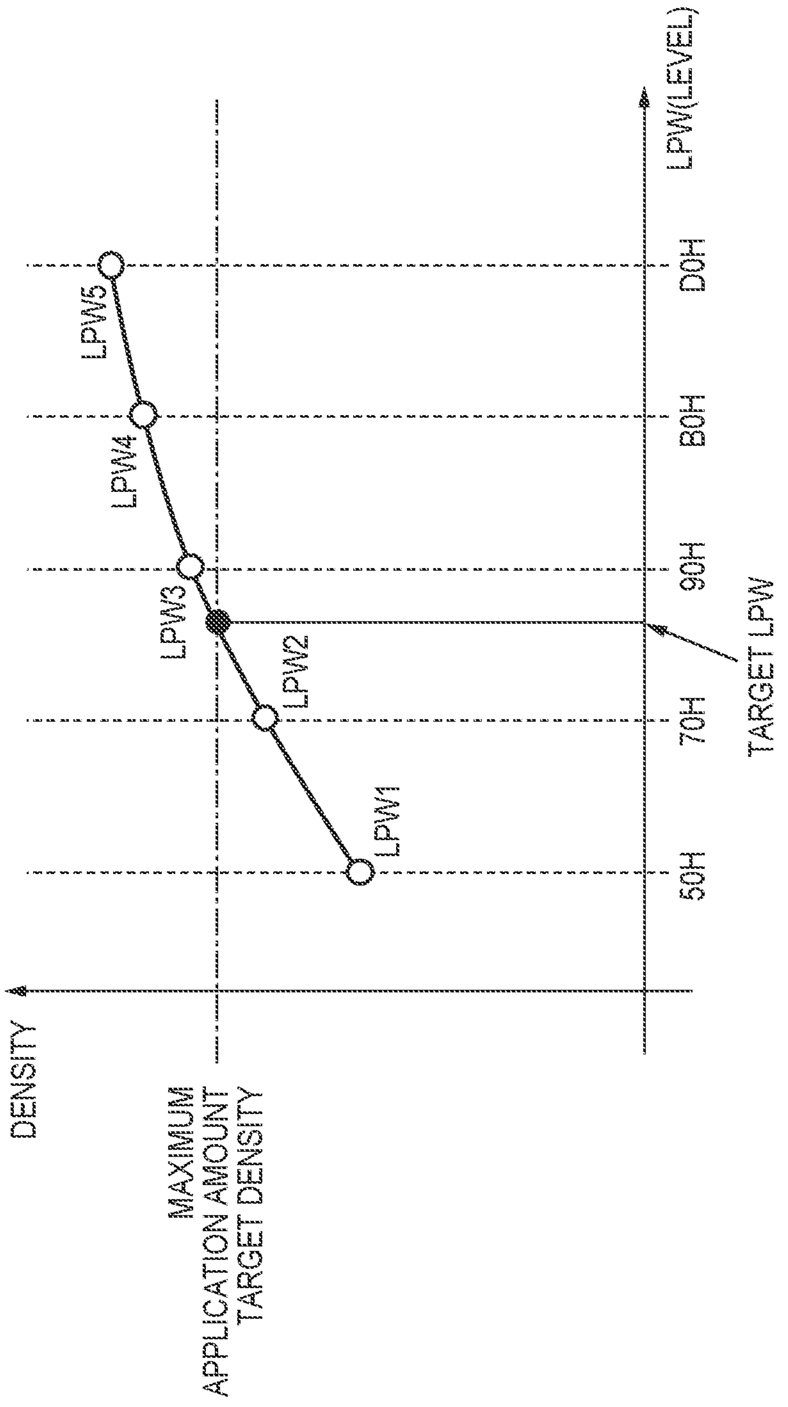
FIG. 7 is a conceptual explanatory diagram of an exposure intensity determination made when correcting a maximum toner application amount in the present embodiment.

A user sets the outputted sheet in the reader unit, and the density of the image pattern is automatically detected (step S403). FIG. 7 is a diagram showing the relationship between the density value and the LPW of each patch image. The toner application amount can be adjusted by controlling the LPW in accordance with a density target value (hereinafter, also referred to as "the maximum application amount target density value") which sets a detected density value as the target.

Tone Correction and Base Value Acquisition

When the adjustment of the maximum toner application amount is completed, the tone characteristics are corrected next. Here, using the previously determined grid bias (Y), development bias (Vdc), and LPW level, an image pattern of 64 tones (density levels) of each color is formed and outputted onto a sheet (step S404). The number of tones is not limited to this. A user sets the outputted sheet in the reader unit, and the density of the image pattern is automatically detected (step S405).

Figure 8:
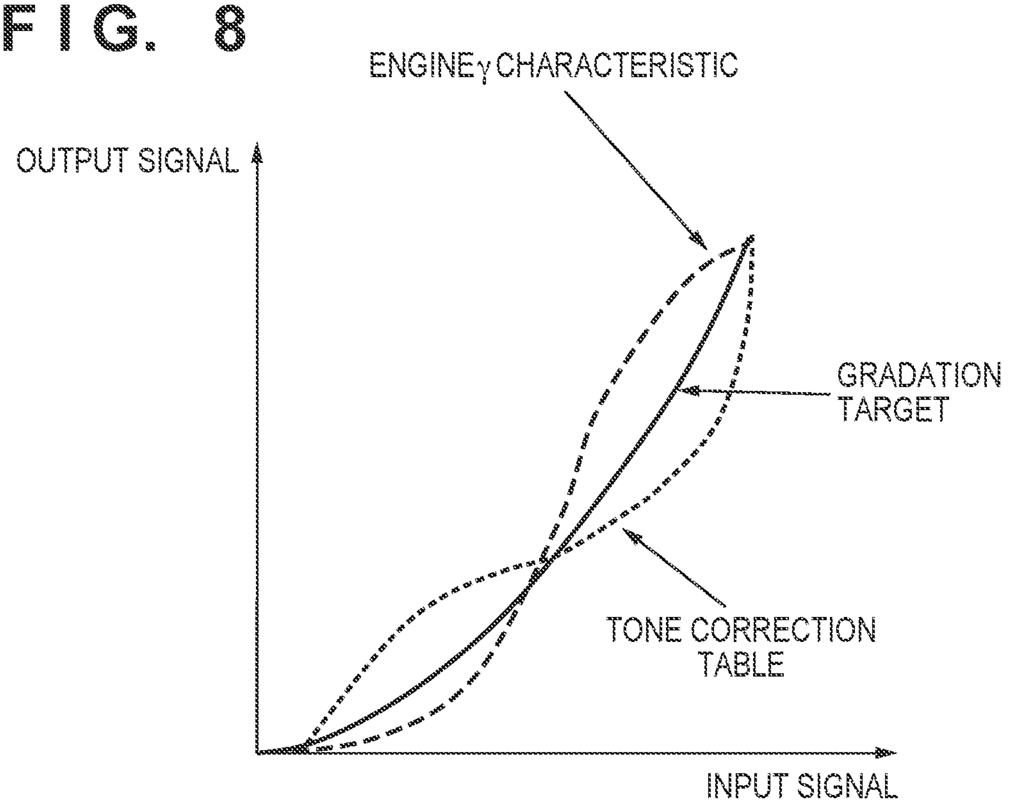
FIG. 8 is a view that illustrates a tone correction table for an automatic tone correction in the present embodiment.

From the density obtained from the image pattern, interpolation processing and smoothing processing are performed to obtain an engine γ (gamma) characteristic of the entire density region. Next, using the obtained engine γ characteristic and a preset target tone, a tone correction table for converting the input image signal into an image signal for output is created (step S406). In the present embodiment, as shown in FIG. 8, inverse conversion processing is performed so as to match the target tone to create a tone correction table. When this work is completed, the density on the paper is matched to the target tone over the entire density region.

The target LPW determined by the above procedure is applied, and a toner image pattern including a test image of a plurality of tones (i.e., density levels) is formed for each color component using the tone correction table (step S407). If the density of the test image is detected on the intermediate transfer member by using the image density sensor 400 (step S408), that density value becomes the target density on the intermediate transfer member, and is stored in a density storage unit 331 (see FIG. 3) as the base density (step S409). In the present embodiment, after the tone correction table is created, a test image of 10 tones of each color is formed, the test image is measured using the image density sensor 400, and the result is stored as a base density in the density storage unit 331. The density storage unit 331 stores measurement results of the image density sensor 400 that vary according to the density of the test image. The data stored in the density storage unit 331 is, for example, test image density values. Note that the density values may be stored, for example, together with a density value before or after a tone correction corresponding to that density. However, it is necessary to decide which. If test images to be formed are determined in advance, a detected density value for each test image may be stored without association with a density value. The base density value is referenced during calibration.

Further, values of sensor output, counter, and timer, and the image forming conditions such as the grid bias, the developing bias, and the LPW level when the base density is acquired by performing the automatic tone correction are stored as the base signal values in a signal value storage unit 321 (step S410). Referring to the base density, the engine γ characteristic, and the base signal values thus obtained, the tone correction table is updated as described below. Although the automatic tone correction processing of FIG. 4 has been described as forming a test image on a recording medium such as a sheet in the above description, configuration may be such that the density of the test image formed on the intermediate transfer belt is measured by the image density sensor 400.

Density Calculation by Measurement

Figure 9:
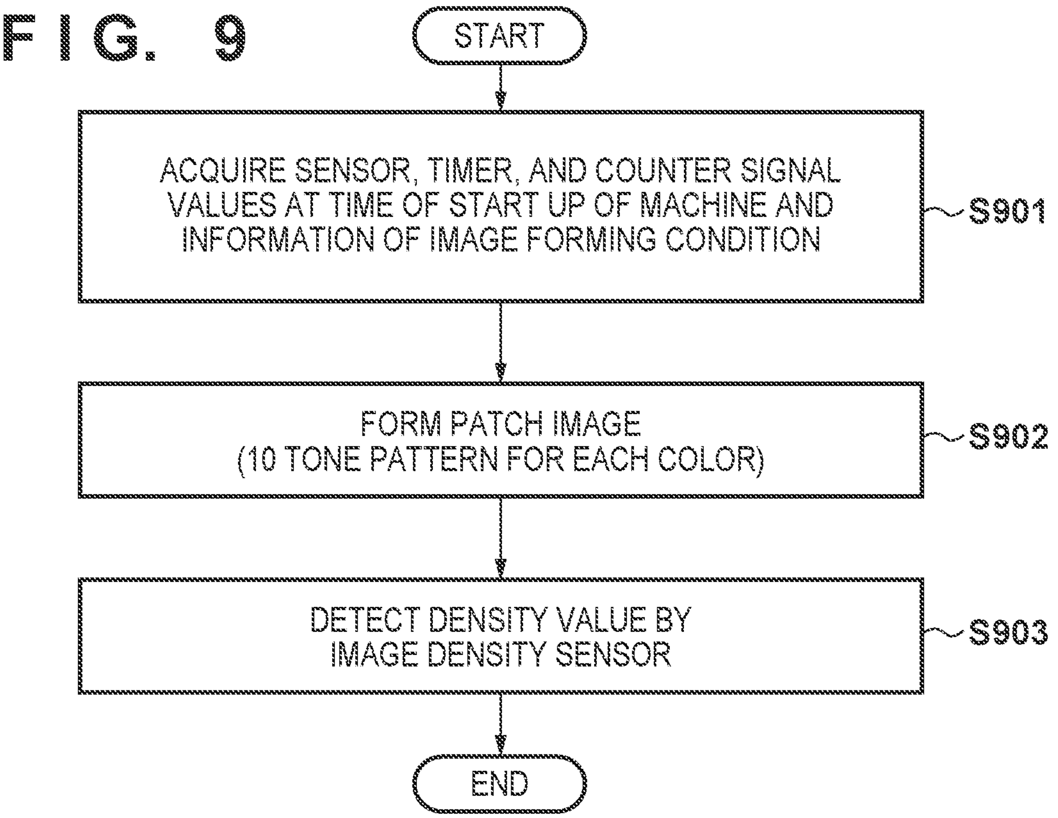
FIG. 9 is a view illustrating a flow for density calculation in which patch image formation is performed in the present embodiment.

First, FIG. 9 shows a flow in which the density value in the current image forming apparatus is measured in normal image correction control.

When this process is started, information such as environment values at startup, a time in which the image forming apparatus is not forming an image, and the number of times toner was replenished and information of an image forming condition for image formation are acquired as input signal values from a sensor, a timer, and a counter provided in the image forming device (step S901).

Next, the toner image pattern is formed under the image forming condition according to the acquired information (step S902). In the present embodiment, a pattern of 10 density levels for each color is formed, but the present invention is not limited thereto. The toner image pattern may be the same pattern as the test image formed in step S407 of FIG. 4. That is, the density values of the respective toner image patterns may be the same as those of the test image formed in step S407.

Next, the density of the formed toner image pattern is detected (step S903) on the intermediate transfer member using the image density sensor 400, and density values (γ characteristic) at the time of correction are acquired. Then, based on the density values (referred to as second data) obtained by the procedure of FIG. 9 or the gamma characteristic (output gamma characteristic), the tone correction table is updated, but this will be described with reference to FIG. 12 to FIG. 15.

In the present embodiment, since measurement control or prediction control of the image density is made to be a model for measuring or predicting the image density on the intermediate transfer member, a density value measured on the intermediate transfer member is stored as a density value serving as a reference for prediction. However, for example, in the case of measuring or predicting the image density on the recording medium, the image density on a recording medium is measured and stored as a density value serving as a reference of the prediction model. The measurement position of the base density may be appropriately selected according to the position of the density of the formed image that is handled in the image density prediction model that is used, and is not limited to the above.

Density Calculation by Prediction

Figure 3:
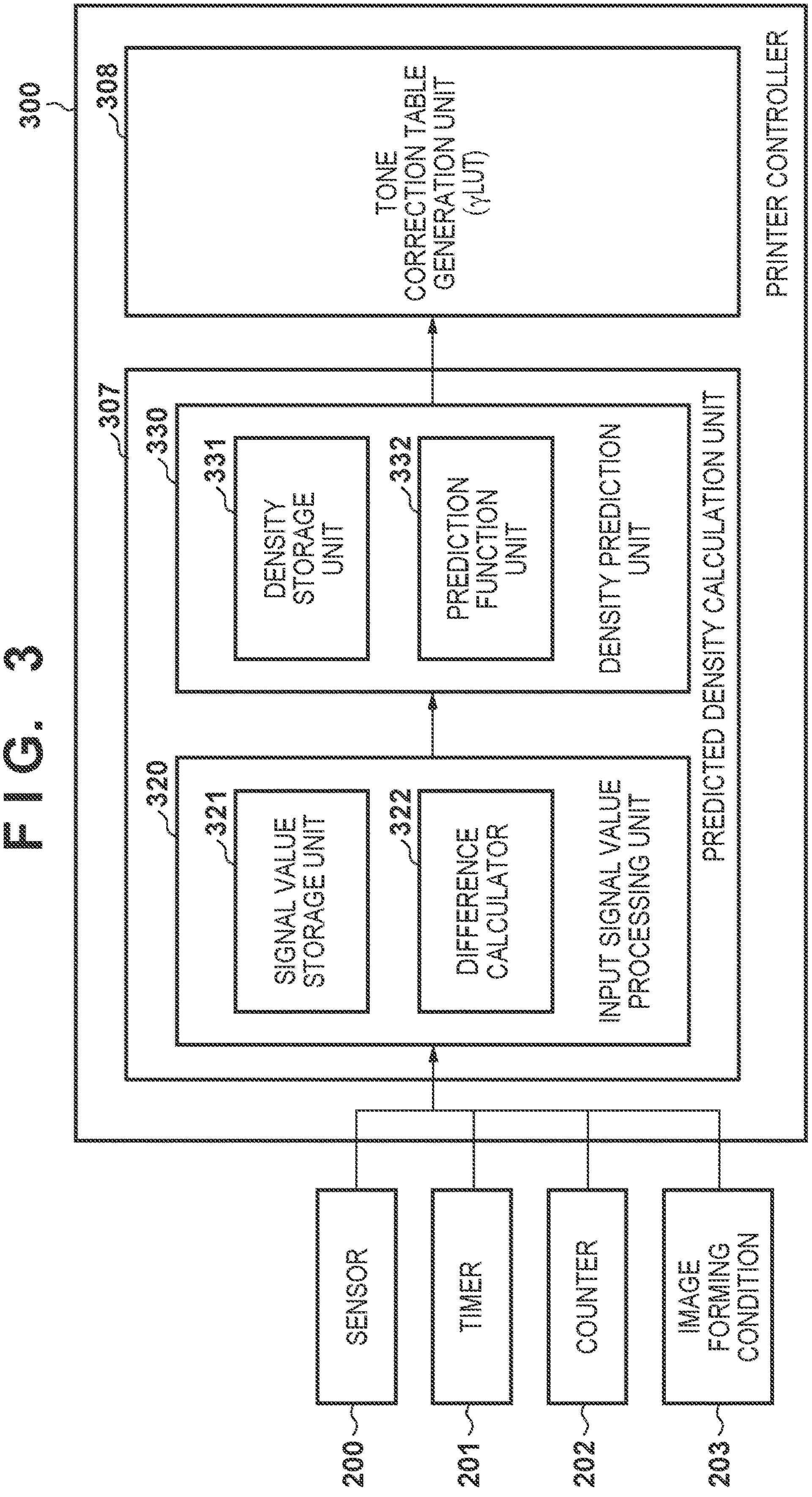
FIG. 3 is a block diagram of a density prediction unit.

Next, a flow for predicting the density of the predicted density calculation unit in the printer controller will be described with reference to FIG. 3 and FIG. 10.

In the image forming engine unit, the image forming apparatus includes a sensor 200, a timer 201, and a counter 202 that detect an external environment such as a temperature. The various signal values therefrom and an image forming condition 203 such as the current exposure intensity (hereinafter, LPW)/charging potential (hereinafter, Vd) in the image forming apparatus are inputted to the predicted density calculation unit 307 in the printer controller. At this time, first, the signal values are inputted to the input signal value processing unit 320 in the predicted density calculation unit 307. The input signal value processing unit 320 includes the signal value storage unit 321 for storing a signal value as a base and a difference calculator 322 calculates the difference between the signal value stored in the signal value storage unit 321 and the inputted signal value. Here, information indicating the environment inside and outside the image forming apparatus is referred to as an environmental condition, and may be referred to as condition information including the environmental condition and the image forming condition.

The signal values processed by the input signal value processing unit 320 are inputted to the density prediction unit 330. The density prediction unit 330 includes the density storage unit 331 that stores the base density, and a prediction function unit 332 that predicts the density from the input value from the input signal value processing unit 320. The prediction function unit 332 has an image density prediction model for calculating the amount of change in density from a base density from the input value, and calculates the current predicted density by adding the calculated density change amount and the base density stored in the density storage unit 331. Further, acquisition of a base signal value and acquisition of the base density will be described later.

The calculated predicted density is inputted to the tone correction table generation unit 308, and a γLUT for inputting to the tone correction unit 316 is generated. The tone correction method will be described later.

Figure 10:
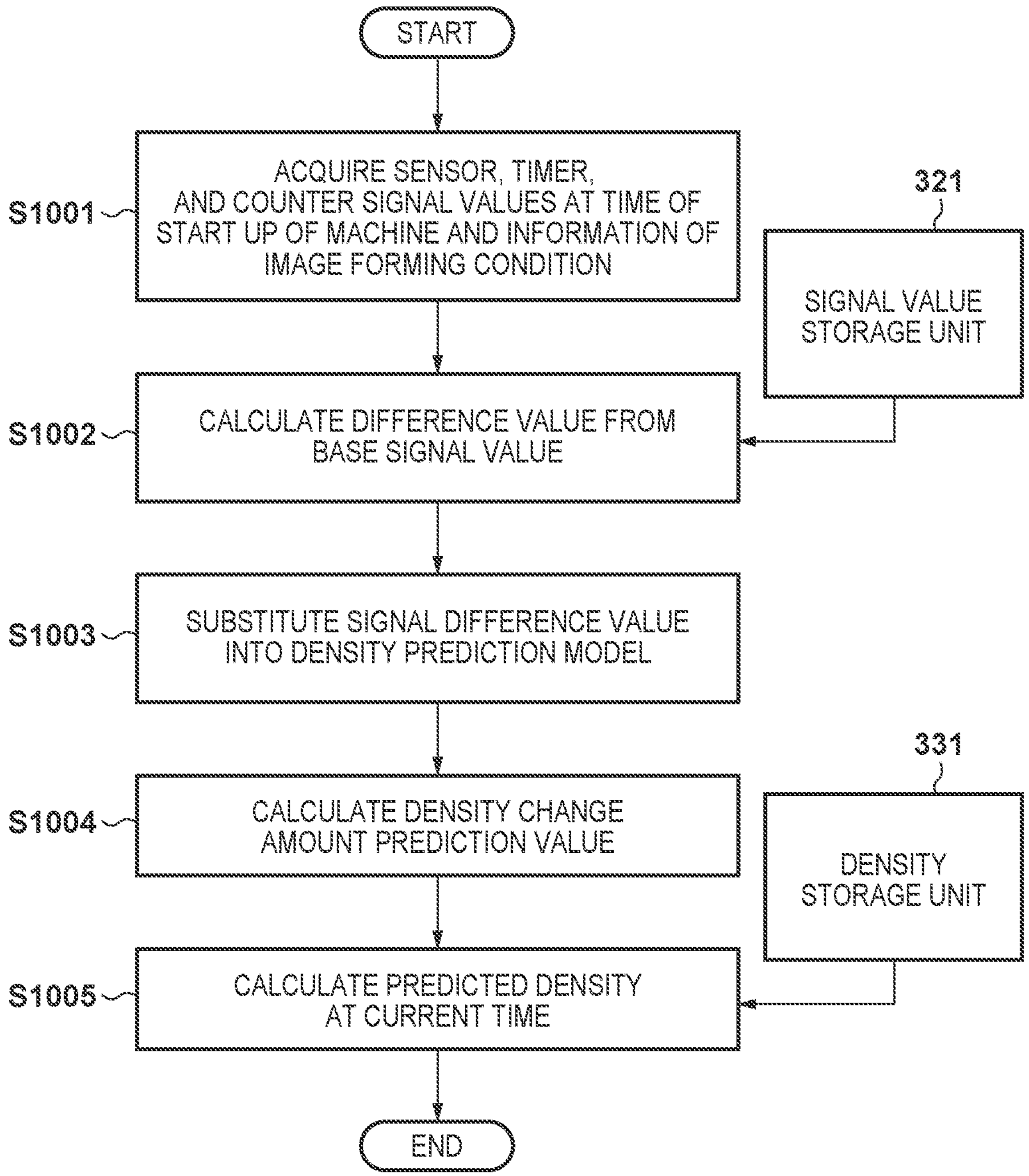
FIG. 10 is a view illustrating a flow for calculating a predicted density from an image density prediction model in the present embodiment.

The flow of calculating the predicted density value is as shown in FIG. 10. Here, in the above-described method, a flow for predicting a density when the machine is activated in a state in which a base signal value and a base density are acquired in advance will be described.

First, when this process is started, information indicating the environment inside and outside the image forming apparatus, such as environment values such as temperature and humidity at startup, a time elapsed since the last image forming by any image forming units PY, PM, PC, and PK, and the number of times toner was replenished, and information of an image forming condition for image formation are acquired as input signal values (step S1001). This information may be obtained, for example, from a sensor, a timer, a counter, or the like provided in the image forming apparatus. The image forming conditions include, for example, exposure intensity (hereinafter referred to as LPW), charging potential (hereinafter referred to as Vd), and the like. The LPW and the Vd can also be referred to as information correlated with the density of the image to be formed. In addition to this, there is information correlated with the density of the image to be formed; for example, the temperature in the machine and a type of sheet may also be correlated with the density of the image to be formed, and in that case, this information may also be referred to as information correlated with the density of the image to be formed. Of course, there may be information correlated to the density of the image in addition to this. The difference between an acquired signal value and the base signal value stored in advance in step S410 is extracted (step S1002).

Next, the extracted difference value is substituted into an image density prediction model equation created in advance based on study (step S1003), and prediction value of the value of the difference from the base density of the current density is calculated (step S1004). From the sum of the difference prediction value and the base density value stored in the density storage unit 331, the current predicted density value (referred to as first data) is calculated, and the γ characteristic is obtained (step S1005).

Based on the density value or the gamma characteristic obtained by the procedure of FIG. 10, the tone correction table is updated, and this is described with reference to FIG. 12 to FIG. 15.

As described above, in the present embodiment, the configuration and the function for performing the calibration of a density tone based on the measured value and the calibration of the density tone based on the prediction model are provided.

Control Timing of Measurement Control and Prediction Control

The density correction sequence according to measurement control in which an image pattern is formed on the intermediate transfer belt and the image pattern is read by the image density sensor is often performed by interrupting the image forming sequence which is generally a printing operation. Therefore, the control time required for one density correction sequence directly reduces the productivity. However, if the measurement control is performed at a low frequency in consideration of the drop in productivity, it leads to a worsening in tone and density variation. Based on this background, in conventional image forming apparatuses, the control timing of measurement control is set in consideration of a balance between tone and density variation and productivity. Although it may be possible, depending on the configuration of the main body, to improve the frequency of the measurement control by forming an image pattern outside the image forming range, it is difficult to increase the frequency of the measurement control because performing the measurement control at a high frequency may lead to an increase in the amount of toner used, that is, an increase in cost.

However, by executing prediction control, it is possible to compensate the density correction between measurements and suppress the tone and the density variation. Since the prediction correction does not require processing such as image formation or reading of an image, the required time is short, and consumables such as toner and sheets are not consumed.

Figure 11A:
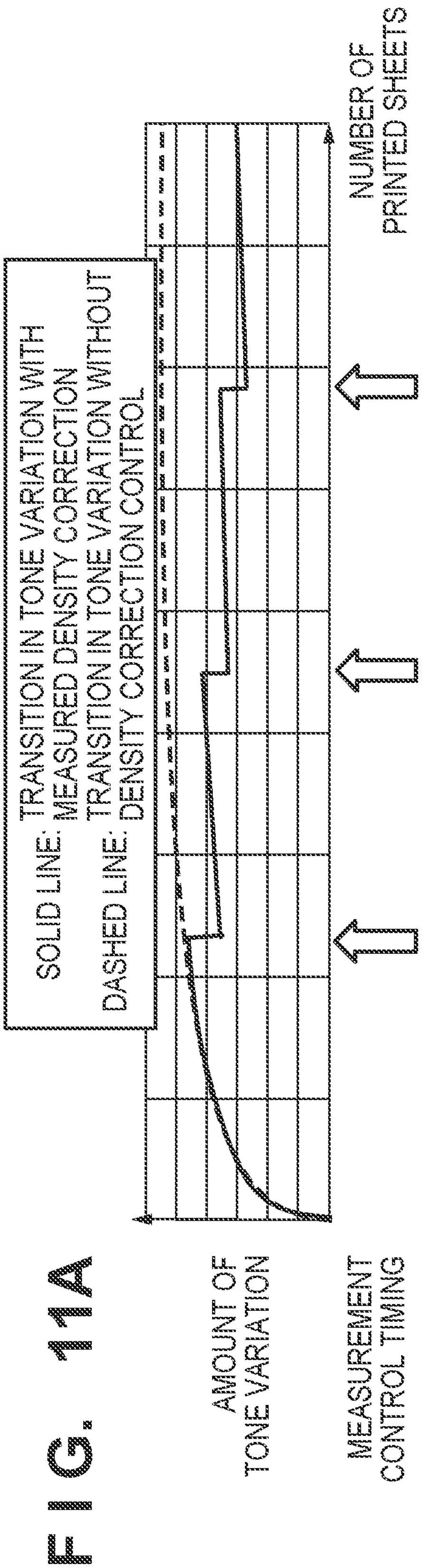
FIG. 11A is a view illustrating the execution timing and effect of measurement control in the conventional art.
Figure 11B:
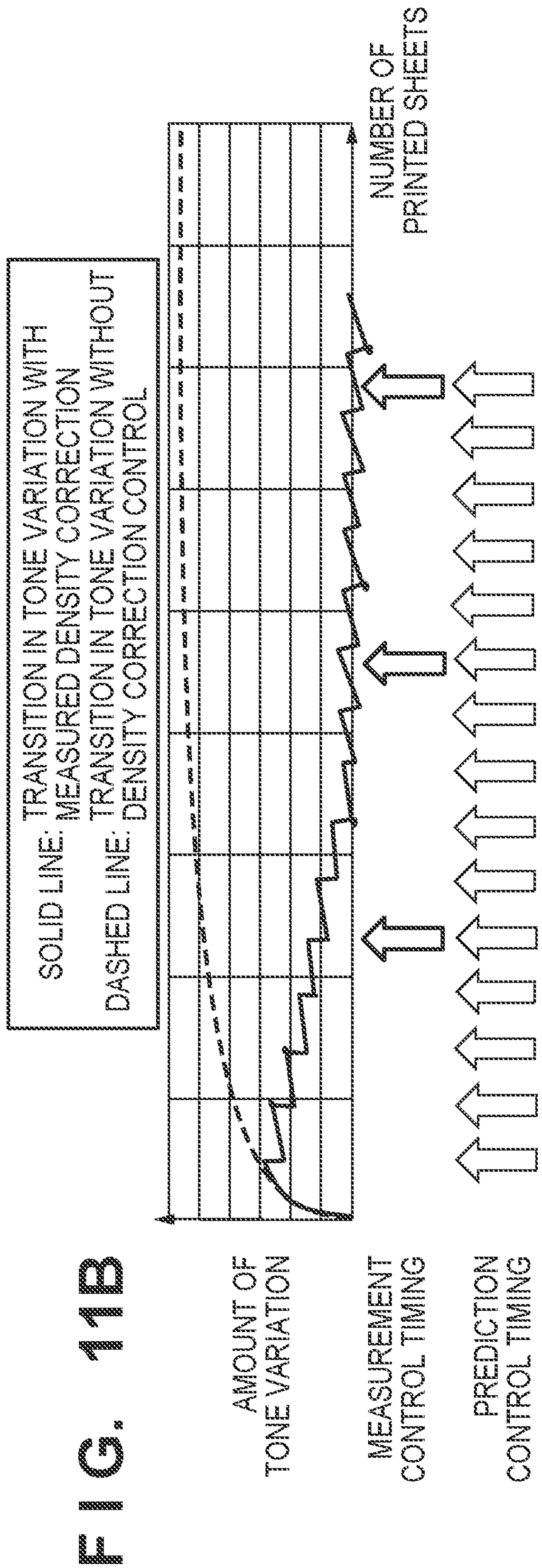
FIG. 11B is a view illustrating the execution timing and effect of measurement control and prediction control in the present embodiment.

A schematic diagram for the control timing of the measurement control and predictive control is shown in FIG. 11A and FIG. 11B. FIG. 11A shows the timing of density correction control when the control is performed only by the conventional measurement control, and tone variation at that timing. On the other hand, FIG. 11B shows density correction timing for control that interlaces measurement control and predictive control which is performed in the present embodiment, and tone variation. As a result, density correction can be performed at a higher frequency by the density correction control shown in FIG. 11B, and therefore, it is possible to further suppress tone variation.

In addition, in the present embodiment, the prediction control is performed at the same time at as the measurement control, and the purpose thereof is to compensate for accuracy deterioration by the prediction control because the accuracy of the measurement control deteriorates depending on the surface state of the intermediate transfer belt on which the image pattern is formed. For example, if the surface state of the intermediate transfer member deteriorates or the sensor 400 becomes dirty, the accuracy of the density measurement value may drop. In this case, a decrease in the accuracy of the measured value will appear as a change in the density. Therefore, the prediction control compensates for the deterioration of the accuracy. Accordingly, if the prediction control is to be performed only for the purpose of a compensatory function of the measurement control, configuration may be taken so as perform the prediction control only at a timing simultaneous to the measurement control.

LUT Creation Method

Next, in this embodiment, a method of reflecting the calculated density value (or gamma characteristic) in a LUT will be described. First, at the time of automatic tone correction performed arbitrarily by the user, a tone correction table (hereinafter referred to as "base correction LUT") is formed in accordance with the engine γ characteristic so as to achieve a preset target tone (hereinafter referred to as "tone LUT"). Thereafter, as described above, base density values of 10 tones for each color, which are the reference for comparison of the density calculation by measurement or prediction, are acquired. The density curve generated from this base density value is defined as a reference density curve.

Figure 12:
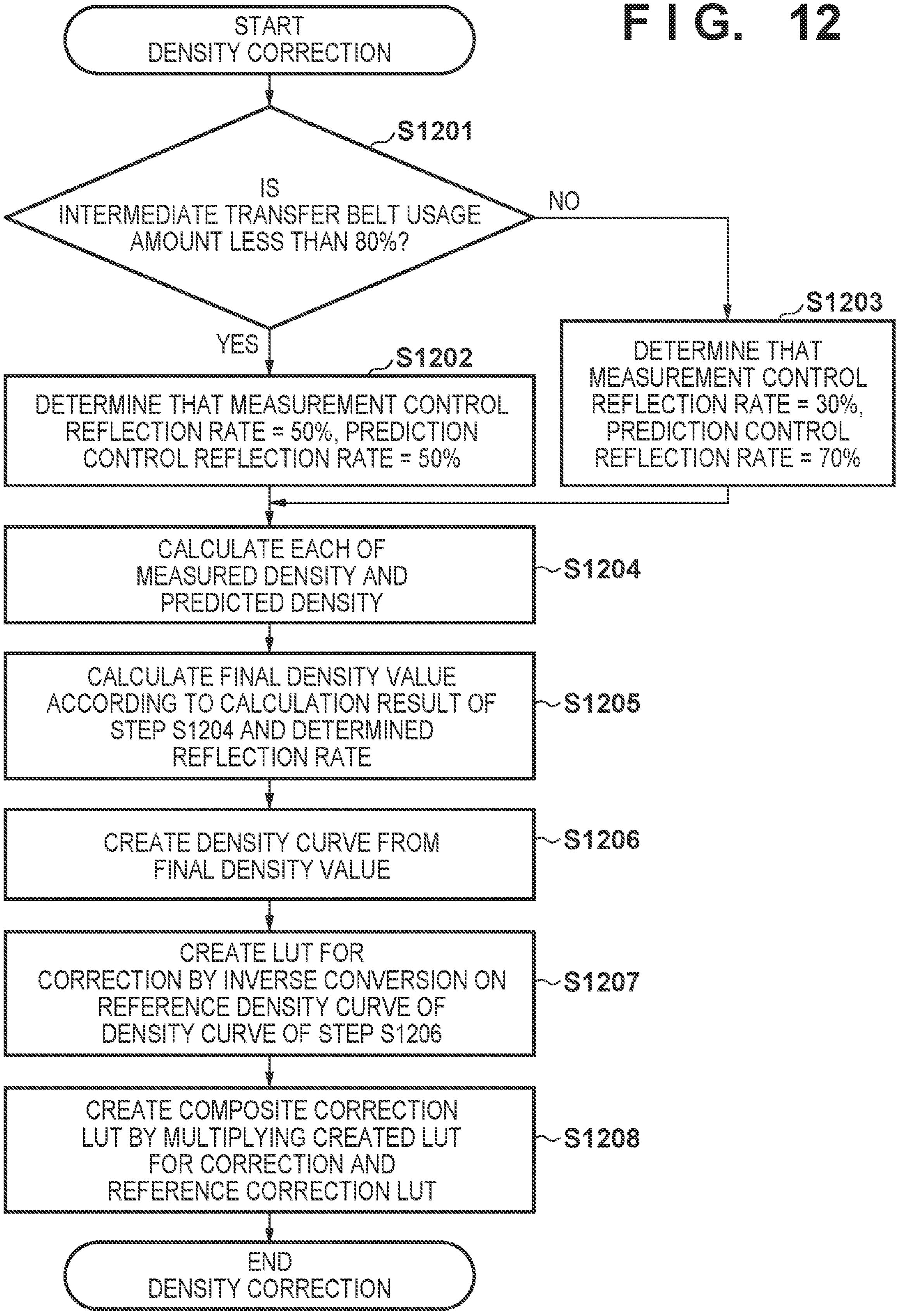
FIG. 12 is a view illustrating a flow for generating a LUT for correction from a density calculation value in a first embodiment.

Thereafter, for example, at the time the power is turned on, at the time of a return from sleep, at the time of an environmental variation, or at a preset timing, density values are calculated by measurement control and prediction control, and an LUT (hereinafter referred to as a composite correction LUT) for the time of image output is generated using the calculated density values. As described with reference to FIG. 11A and FIG. 11B, when the measurement control is performed, simultaneously predictive control is also performed. FIG. 12 and thereafter, the procedure will be described in the case of performing predictive control at the same time as measurement control. Calibration by the measurement control and predictive control may be executed upon a preset condition such as the condition that the printing of a predetermined number of pages has been performed since the last time calibration by measurement control was performed. In this case, calibration may be by predictive control alone when other factors occur, for example, when the power is turned on, upon return to sleep, and when the environment changes.

A method of creating the composite correction LUT will be described with reference to FIG. 12, FIG. 13, FIG. 14, and FIG. 15.

FIG. 12 is a flow diagram for creating a composite correction LUT from measured density and predicted density calculation results. First, the current usage history of the intermediate transfer belt (intermediate transfer member 6) is ascertained. This amount of usage refers to the number of sheets printed using the intermediate transfer belt, the rotation time of the intermediate transfer belt, and the like, which are obtained by information from a usage amount measurement unit such as a part counter. For example, when replacing the intermediate transfer belt, an initial count value at that time is stored, and by subtracting the initial count value from the current count value, it is possible to know a usage amount indicating how much the belt has been used since it was new. Here, it is determined whether or not the amount of usage of the intermediate transfer belt is less than a predetermined amount, e.g., less than 80%, with respect to an expected lifetime usage amount (e.g., a number of printed sheets over its lifetime) (step S1201).

When it is determined that the usage amount is less than 80% of the life span, measurement control is determined to be reflected in the density correction at a rate of 50%, and predictive control is determined to be reflected in the density correction at a rate of 50% (step S1202). When it is determined in step S1201 that the usage amount of the intermediate transfer belt is equal to or more than a predetermined amount, for example, equal to or more than 80%, the measurement control is determined to be reflected in the density correction at a rate of 30%, and the predictive control is determined to be reflected in the density correction at a rate of 70% (step S1203).

Here, the reason why the reflection rate of the measured value is reduced is as described above. It is because, for example, the detection accuracy of the image pattern deteriorates due to extremely fine unevenness or unevenness generated on the surface due to the usage history of the intermediate transfer belt. However, the measurement correction reflection rate is not set to 0% in order to detect, by measurement, variation in the actual image pattern which cannot be predicted by a density prediction model, and reflect that in the density correction. For example, there may be a situation in which the photosensitive drum or the developing apparatus 4 is replaced but counter information is not set correctly, or a case in which there is a difference between the detected value and the actual state of various sensors for detecting information required for the density prediction due to the individual differences.

By the method described above with reference to FIG. 9 and FIG. 10, the density according to the measurement control, i.e., the measured density calculation value, and the density by the prediction control, i.e., the prediction control calculation value are respectively obtained (step S1204). The final density value is calculated by multiplying each of the density calculation values by the reflection rates obtained in step S1202 or step S1203, respectively (step S1205).

For example, consider the case where the measurement control is determined to be reflected in the density correction at a rate of 30% and the predictive control is determined to be reflected in the density correction at a rate of 70% as in step S1203. In this case, when the measured density calculation value obtained in step S1204 is reflection density 0.7 and the predicted density calculated value is reflection density 0.8, the final density value is calculated by the calculation method shown in the following equation 1.

$$0.8\times(30\div100)+0.7\times(70\div100)=0.73 \quad \text{(equation 1)}$$

Here, a density value of tone is taken as an example, but a similar calculation is performed on 9 other tones to calculate a final density value of 10 tones. This calculation is performed for each color component. In this way, the density value is obtained by a weighted average of the measured value and the prediction value by using a weighting determined according to the amount of usage of the intermediate transfer member (the number of rotations or the travel distance).

As described above, in the situation where density calculation values are different between measurement control and prediction control, and it is assumed that the image pattern detection accuracy of the measurement control has dropped at that time, the density correction reflection rate is changed so that a value closer to the density calculation value of the prediction control is calculated as the final density value. This determination of the correction reflection rate is performed at each of the measurement control timings shown in FIG. 11B, and the reflection rate is revised in accordance with the usage state of the image forming device each time.

Further, the correction reflection rate of the prediction control shown in FIG. 11B performed when the measurement control is not performed indicates the result of tone variation that results from fixing the density value predicted by the prediction control at 100% at all times. The correction reflection rate for predictive control correction at this timing may apply the reflection rate determined by the flow for determining the density correction reflection rate. In this case, there is a possibility that the tone variation correction amount will decrease, and therefore, it is good to determine the content of the correction amount in accordance with the prediction accuracy of the density prediction control and the tone variation. These configurations are not intended to limit the scope of the claims. However, since density value measurement is not performed at this timing, the values measured the last time measurement control was performed may be stored and used.

Figure 13:
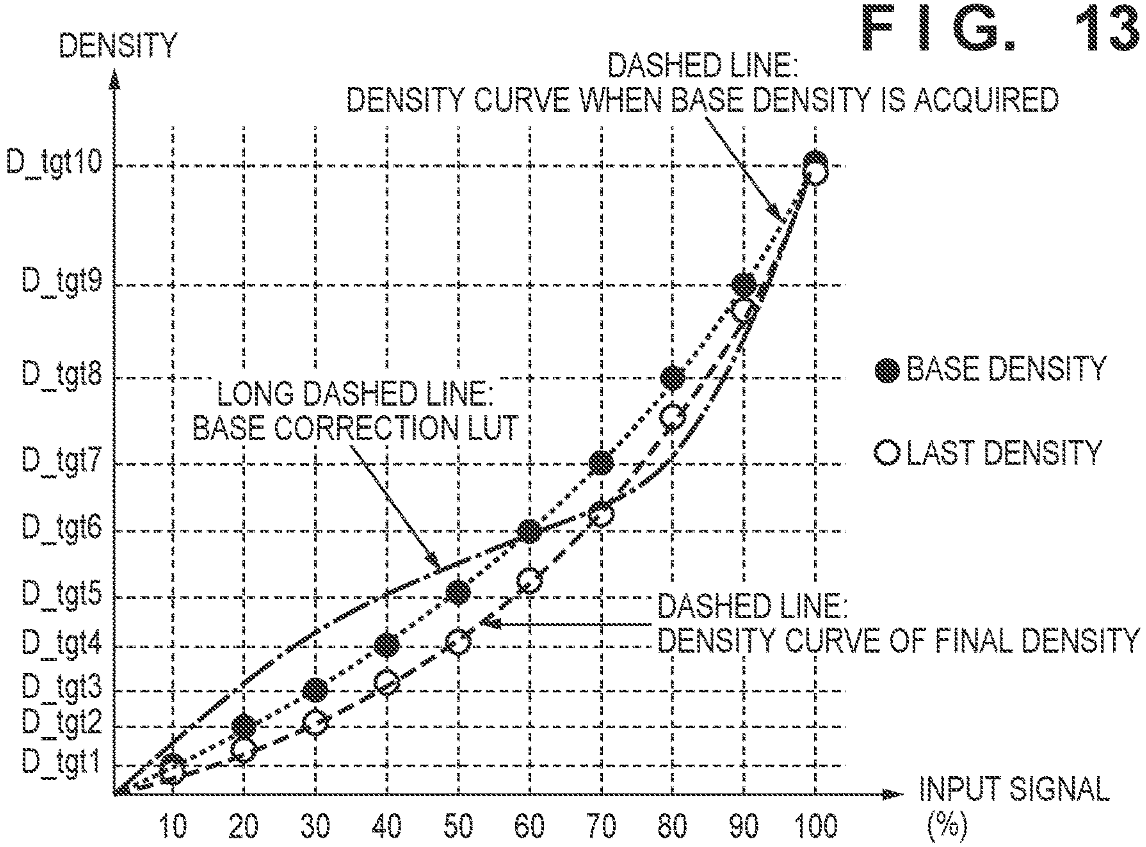
FIG. 13 is a view illustrating a relationship between a base correction LUT, a base density curve, and a final density curve in the present embodiment.

Next, the obtained final density values are plotted for each tone, and a density curve (the present engine γ characteristics: dashed line) is created for the density values indicated by the ○ points in FIG. 13 (step S1206).

Figure 14:
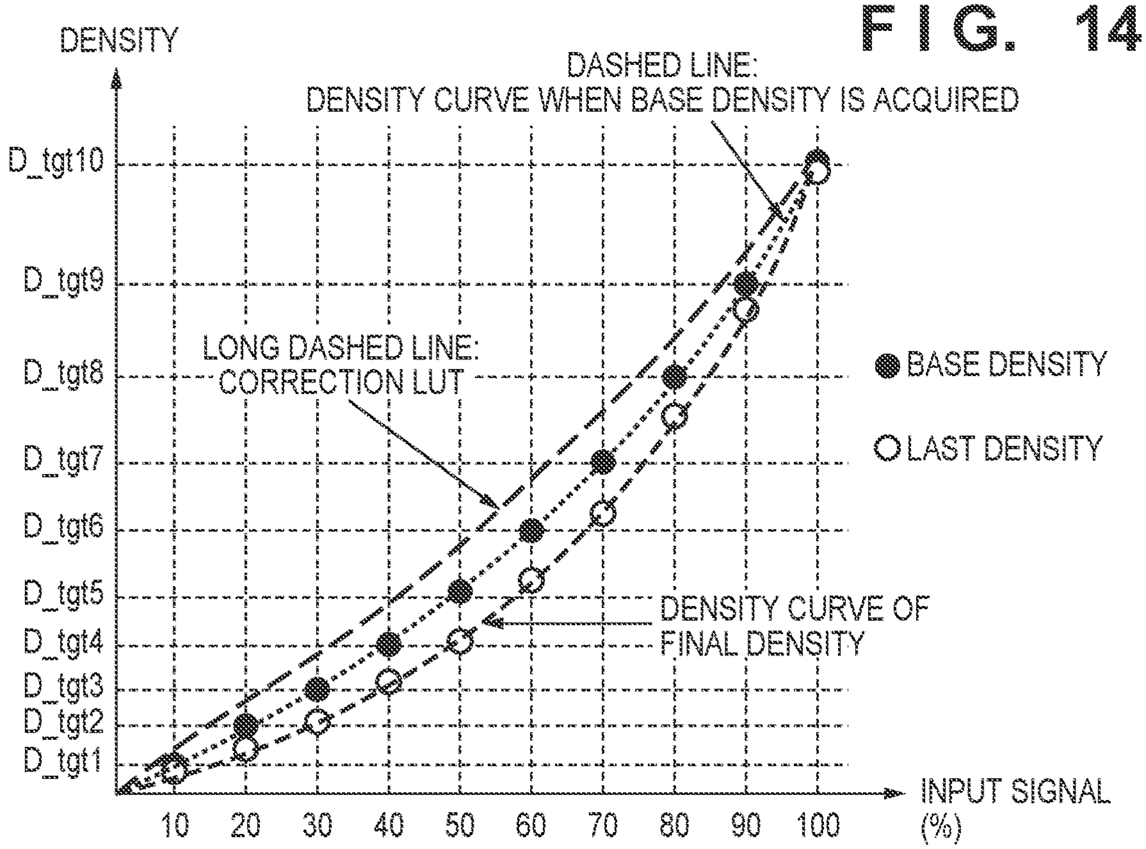
FIG. 14 is a view illustrating an LUT for correction that is generated from the final density curve in the present embodiment.

In order to correct the density curve of the final density to the density curve of the base density created at the time of the automatic tone correction shown in FIG. 4, an inverse transformation is performed to create an LUT at the time of correction as shown by the long dashed line in FIG. 14 (step S1207). When this correction is performed, the γ characteristic of the final density is converted to the γ characteristic of the base density according to the LUT.

Figure 15:
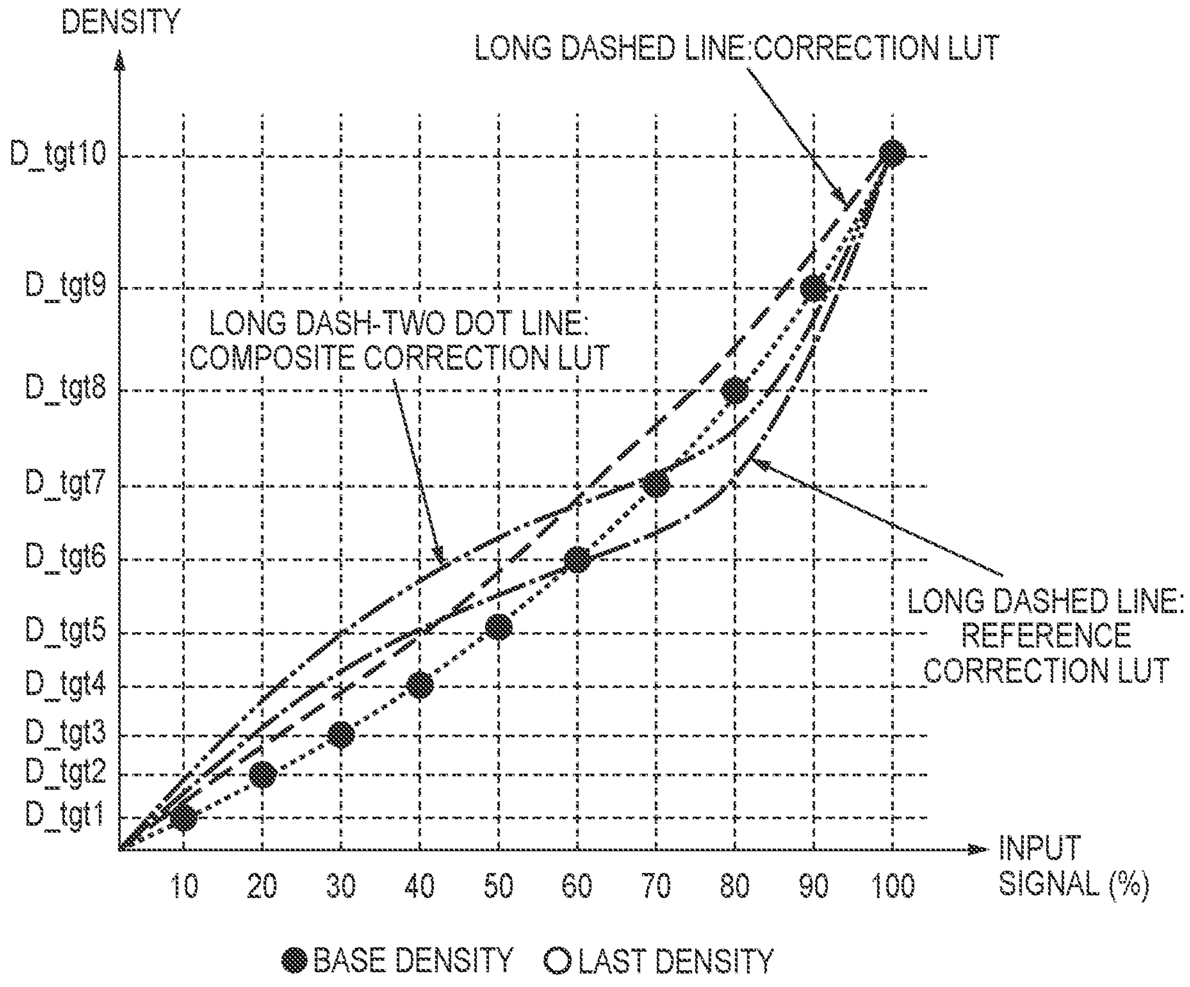
FIG. 15 is a view illustrating a relationship between a base correction LUT, an LUT for correction, and a composite correction LUT in the present embodiment.

Finally, the composite correction LUT shown by the long dash-two dot line in FIG. 15 is created by multiplying the LUT for correction and the base correction LUT (the tone correction table in FIG. 8) at the time of automatic tone correction (step S1208). This composite correction LUT becomes a tone correction table used at the time of image formation thereafter. That is, the input image signal is corrected by the composite correction LUT, and an output image is formed and output.

The density curve may be generated by a commonly used approximation method such as using an approximation formula that connects 10 points.

When calibrating density only by the predictive control between density calibration by the procedure of FIG. 12, it is possible to execute the procedure of FIG. 10, and thereafter execute step S1206 of FIG. 12 onward using a density value obtained in that procedure as the final density as it was referred to in FIG. 12.

According to the invention of the present embodiment, two density calculation values of the method of measuring the formed image pattern to calculate tone/density values and the method of calculating tone/density values using a prediction model are used in combination in calibration for controlling stabilization of tone/density tone characteristics. By changing the rate at which each density calculation value is reflected in the correction according to the situation, it is possible to accurately capture the actual change in density and provide high accurate density correction control.

In the present embodiment, a density prediction model by machine learning is used for the prediction of the density, but it need not be a model of machine learning. That is, a table for specifying prediction values for variation in density may be prepared in advance, and prediction may be made by referencing the table. For example, the table may be configured to output parameters such as the environment within the image forming apparatus, the extent to which the developing apparatus 4 including the photosensitive drum and the developing roller have been used (the number of rotations or the traveling distance), the surface area ratio of a region where the toner is applied to the image surface area, and the amount of density variation corresponding to the values of these parameters.

Second Embodiment

Figure 16A:
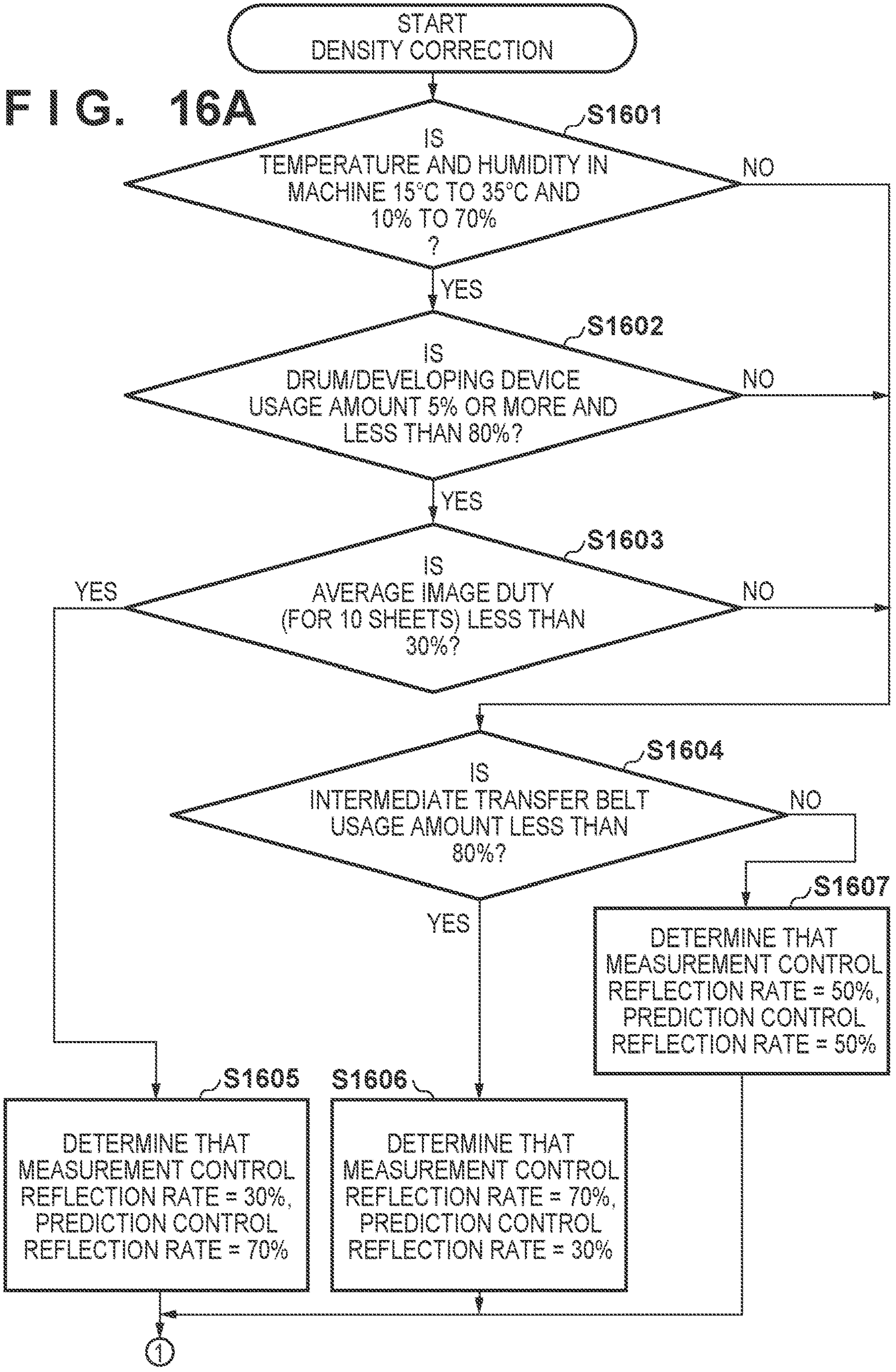
FIGS. 16A and 16B illustrate a flow for generating an LUT for correction from a density calculation value in a second embodiment.
Figure 16B:
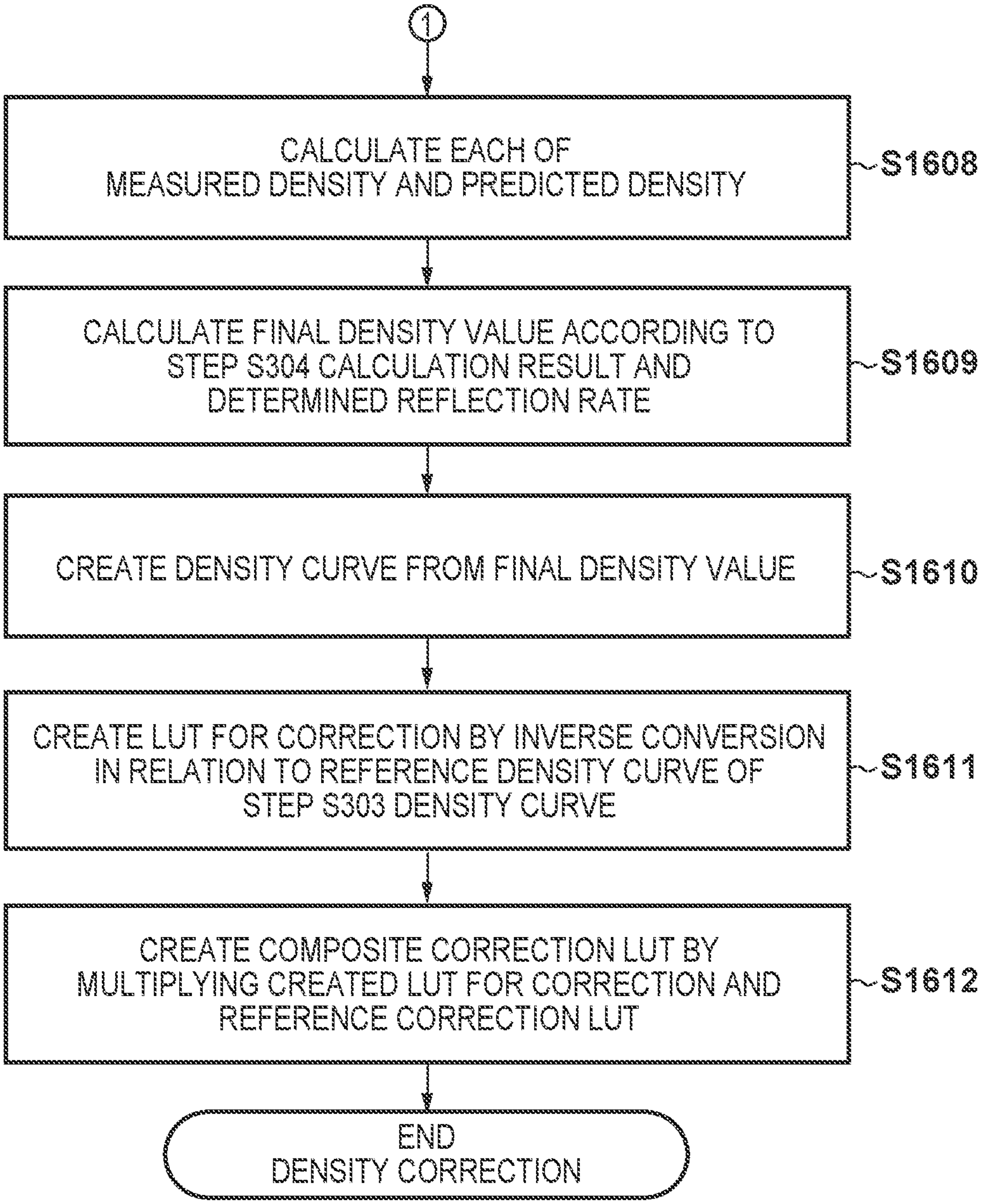

In the first embodiment, the rates at which measurement results and prediction results are reflected in the LUT creation are determined in accordance with the usage amount of the intermediate transfer member 6 (intermediate transfer belt). In the present embodiment, by adding a conditional branch for determining the reflection rates (or weighting) of measurement results and prediction results, it is possible to continue to execute the density prediction with high accuracy. FIGS. 16A and 16B are a flow diagrams for creating a composite correction LUT from a measured density and the result of calculating a predicted density in the present embodiment.

First, the temperature and humidity state in which the image forming apparatus is currently being used is ascertained. Typically, these are ascertained by detection by an environment sensor capable of detecting temperature and humidity, which is installed within the image forming apparatus. The environmental sensor determines whether the temperature in the machine is within a predetermined range, for example 15° C. to 35° C., and whether the relative humidity is within a predetermined range, for example 10% to 70% (step S1601). Here, the target of determination may be either temperature or humidity. When the condition is met, it is determined that the accuracy of the predictive control may be higher than the accuracy of measurement control, and the flow proceeds to the determination of step S1602. In step S1602, it is determined whether the usage amount of the photosensitive drum or developing roller are both within a predetermined range, for example, within a range of 5% or more to less than 80% (step S1602). When a photosensitive drum or developing roller are replaced as a unit, they are also referred to collectively as a drum cartridge. If it is determined in step S1602 that the amount of usage is within the predetermined range, it is determined that the accuracy of the predictive control may be higher than the accuracy of the measurement control as in the previous step, and the process proceeds to step S1603 determination flow.

In step S1603, it is determined whether or not an average image duty per 10 sheets of the printed image data is less than a predetermined value, for example, 30% (step S1603). When it is determined in step S1603 that the duty is less than the predetermined value, the criteria determined in step S1601, step S1602, and step S1603 are all achieved, and it is determined that predictive control will be more accurate than measurement control in the usage state. Then, as shown in step S1605, the reflection rate of the measurement control is determined to be 30%, and the reflection rate of the predictive control is determined to be 70% (step S1605). The criteria determined in step S1601, step S1602, and step S1603 are whether or not the usage condition is as in the conditions when acquiring learning data when creating the density prediction model. That is, learning when creating the density prediction model is performed in an environment such that all of the step S1601 to step S1603 conditions are satisfied. If within the learning data acquisition condition range, the accuracy of the density prediction control tends to be high since it is a learned usage condition, and thus the reflection rate of the prediction control can be increased.

On the other hand, when it is determined in each of the determination steps of step S1601, step S1602, and step S1603 that it is not within any of the predetermined ranges, the flow proceeds to the step S1604 determination. Step S1604, step S1606, and step S1607 are the same as the flow of step S1201, step S1202, and step S1203 of FIG. 12 described in the first embodiment, and therefore description thereof will be omitted. However, the reflection rates are different from that of FIG. 12, and when it is determined in step S1604 that the usage amount of the intermediate transfer belt is less than 80%, the measurement control and the predictive control are weighted at 70% and 30%, respectively, in step S1606. On the other hand, if it is determined in step S1604 that the usage amount of the intermediate transfer belt is 80% or more, the measurement control and the predictive control are weighted at 50% and 50% in step S1607.

Since the rates at which the measurement control and the predictive control are reflected in the density correction are determined in the steps up to this point, the flow transitions from step S1608 to the flow shown in step S1612. The flow from step S1608 to step S1612 is similar to the flow of step S1204 to step S1208 of FIG. 12 described in the first embodiment, and therefore detailed description thereof will be omitted. From step S1608 onward, a weighted average of the density according to the predictive control and the density according to the measured control is taken with weights determined according to whether or not there is a tested condition, and a final density (or gamma characteristic) is determined. Then, the tone correction table is updated in accordance with the final density or the gamma characteristic.

The duty referred to in step S1603, may be the ratio of the time when the light source for exposing the photosensitive element is turned on to the time required for image formation in an electrophotographic printing system, for example, and may be a ratio of the surface area where the toner is applied to the surface area of the print region. In the case of full color image formation, the duty may be for each color component or a sum of the duties of all colors may be employed. In either case, the condition may be the same as at the time of learning.

Further, in step S1601 to step S1603, it is determined whether or not the conditions at the time of creating the density prediction model by machine-learning are satisfied, but other conditions may be added, and at least one of the conditions tested here may be used.

According to the present embodiment, two density calculation values of the method of measuring the formed image pattern to calculate tone/density values and the method of calculating tone/density values using a prediction model are used in combination in calibration for controlling stabilization of tone/density tone characteristics. By providing a determination step where the rates at which each are reflected in the density calculation value correction are changed according to the situation in addition to the determination condition of the first embodiment, it is possible to more accurately capture the actual change in density and provide the density correction control more accurately.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-115829, filed Jul. 13, 2021, which is hereby incorporated by reference herein in its entirety.

What is claimed is:

1. An image forming apparatus, comprising:
an image forming unit configured to form an image based on an image forming condition;
a sensor configured to measure a measurement image formed by the image forming unit; and
a controller configured to:
obtain information correlated with a change in density of an image to be formed by the image forming unit,
control the sensor to measure the measurement image formed by the image forming unit,
determine, based on the information, first data related to density of the image to be formed by the image forming unit,
determine, based on a result of measuring the measurement image by the sensor, second data related to density of the image to be formed by the image forming unit, and
generate the image forming condition based on a weighted average of the first data and the second data, wherein
the image forming unit includes a photosensitive member, an exposure unit configured to expose the photosensitive member in order to form an electrostatic latent image, and a developer unit configured to develop the electrostatic latent image, and
the controller determines a weighting of the weighted average based on a number of rotations of the photosensitive member.

2. The image forming apparatus according to claim 1, wherein
the image forming condition is a tone correction table used to convert image data, and
the image forming unit forms the image based on the image data which is converted based on the tone correction table.

3. The image forming apparatus according to claim 1, wherein
the image forming apparatus further comprises a temperature sensor configured to detect temperature, and
the information includes information of the temperature detected by the temperature sensor.

4. The image forming apparatus according to claim 1, wherein
the image forming apparatus further comprises a humidity sensor configured to detect humidity, and
the information includes information of the humidity detected by the humidity sensor.

5. The image forming apparatus according to claim 1, wherein
the image forming apparatus further comprises a timer configured to measure a time in which the image forming unit is not forming an image, and
the information includes the time measured by the timer.

6. The image forming apparatus according to claim 1, wherein
the image forming unit replenishes toner to the image forming unit from a container in which the toner is housed, and
the information includes a number of times that the toner is replenished from the container to the image forming unit.

7. The image forming apparatus according to claim 1, wherein the information includes the image forming condition set in the image forming unit.

8. An image forming apparatus, comprising:
an image forming unit configured to form an image based on an image forming condition;
a sensor configured to measure a measurement image formed by the image forming unit; and
a controller configured to:
obtain information correlated with a change in density of an image to be formed by the image forming unit,
control the sensor to measure the measurement image formed by the image forming unit,
determine, based on the information, first data related to density of the image to be formed by the image forming unit,
determine, based on a result of measuring the measurement image by the sensor, second data related to density of the image to be formed by the image forming unit, and
generate the image forming condition based on a weighted average of the first data and the second data, wherein
the image forming unit includes a photosensitive member, an exposure unit configured to expose the photosensitive member in order to form an electrostatic latent image, and a developer unit configured to develop the electrostatic latent image using toner carried on the developing roller, and
the controller determines a weighting of the weighted average based on a number of rotations of the developing roller.

9. An image forming apparatus, comprising:
an image forming unit configured to form an image based on an image forming condition;
a sensor configured to measure a measurement image formed by the image forming unit; and
a controller configured to:
obtain information correlated with a change in density of an image to be formed by the image forming unit,
control the sensor to measure the measurement image formed by the image forming unit,
determine, based on the information, first data related to density of the image to be formed by the image forming unit,
determine, based on a result of measuring the measurement image by the sensor, second data related to density of the image to be formed by the image forming unit, and generate the image forming condition based on a weighted average of the first data and the second data, wherein the image forming unit includes a photosensitive member, an exposure unit configured to expose the photosensitive member in order to form an electrostatic latent image, a developer unit configured to develop the electrostatic latent image, an intermediate transfer member to which a toner image developed by the developer unit is transferred, and a transfer unit configured to transfer the toner image from the intermediate transfer member to a sheet, and the controller determines a weighting of the weighted average based on a number of rotations of the intermediate transfer member.

* * * * *